(12) United States Patent
Nagaoka et al.

(10) Patent No.: US 8,144,195 B2
(45) Date of Patent: Mar. 27, 2012

(54) VEHICLE ZONE MONITORING APPARATUS

(75) Inventors: Nobuharu Nagaoka, Shioya-gun (JP);
Takayuki Tsuji, Utsunomiya (JP);
Masahito Watanabe, Utsunomiya (JP);
Hiroshi Hattori, Utsunomiya (JP);
Kouzou Simamura, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 688 days.

(21) Appl. No.: 12/287,433

(22) Filed: Oct. 9, 2008

(65) Prior Publication Data
US 2009/0046151 A1 Feb. 19, 2009

Related U.S. Application Data

(63) Continuation of application No. 10/171,007, filed on Jun. 12, 2002, now abandoned.

(30) Foreign Application Priority Data

Jun. 28, 2001 (JP) ................................. 2001-197312

(51) Int. Cl.
*H04N 7/18* (2006.01)
(52) U.S. Cl. ...................................................... 348/148
(58) Field of Classification Search ........... 348/148–149
See application file for complete search history.

(56) References Cited

U.S. PATENT DOCUMENTS

| | | | |
|---|---|---|---|
| 5,341,142 A | 8/1994 | Reis et al. | |
| 5,410,346 A | 4/1995 | Saneyoshi et al. | |
| 5,414,439 A | 5/1995 | Groves et al. | |
| 5,461,357 A * | 10/1995 | Yoshioka et al. | 340/435 |
| 5,488,674 A | 1/1996 | Burt et al. | |
| 5,764,136 A | 6/1998 | Harron | |
| 5,831,669 A | 11/1998 | Adrain | |
| 5,880,777 A | 3/1999 | Savoye et al. | |
| 5,937,077 A | 8/1999 | Chan et al. | |
| 6,151,539 A | 11/2000 | Bergholz et al. | |

(Continued)

FOREIGN PATENT DOCUMENTS

DE 100 30421 1/2001

(Continued)

OTHER PUBLICATIONS

IEEE Xplore AbstractPlus, 1992.

(Continued)

*Primary Examiner* — David Czekaj
(74) *Attorney, Agent, or Firm* — Carrier Blackman & Associates, P.C.; Joseph P. Carrier; William D. Blackman

(57) ABSTRACT

A vehicle zone monitoring apparatus that detects physical bodies present in the vicinity of the vehicle from infrared images photographed by infrared cameras provided on the vehicle includes an object extracting device that extracts object images that emit infrared radiation from the infrared image and an artificial structure identifying device that identifies whether or not an object is an artificial structure by comparing an image of a search zone in proximity to the object extracted by the object extraction device, to a reference image of a pre-registered artificial structure which serves as an element that defines an artificial structure, and that identifies the object as an artificial structure if: within the search zone in proximity to the object, a section having a high correlation with the reference image exists; and a distance between the vehicle and the object is equal to a distance between the vehicle and the section having the high correlation with said reference image.

6 Claims, 24 Drawing Sheets

U.S. PATENT DOCUMENTS

| | | |
|---|---|---|
| 6,411,328 B1 | 6/2002 | Franke et al. |
| 6,445,832 B1 | 9/2002 | Lee et al. |
| 6,449,384 B2 | 9/2002 | Laumeyer et al. |
| 6,570,608 B1 | 5/2003 | Tserng |
| 6,625,315 B2 | 9/2003 | Laumeyer et al. |
| 6,658,150 B2 | 12/2003 | Tsuji et al. |
| 6,720,920 B2 * | 4/2004 | Breed et al. .......... 342/386 |
| 6,737,963 B2 * | 5/2004 | Gutta et al. .......... 340/435 |
| 6,788,817 B1 | 9/2004 | Saka et al. |

FOREIGN PATENT DOCUMENTS

| | | |
|---|---|---|
| JP | 5-265547 | 10/1993 |
| JP | 9-119982 | 5/1997 |
| JP | 9-226490 | 9/1997 |
| JP | 2001-6096 | 1/2001 |
| JP | 2001-108758 | 4/2001 |
| JP | 2001-134771 | 5/2001 |

OTHER PUBLICATIONS

Traffic Sign Recognition in Color Image Sequences. W Ritter. pp. 12-17, 1992.

Vision Based Car-Following: Detection, Tracking and Identification. M. Schwarzinger. pp. 24-29, 1992.

VITA—An Autonomous Road Vehicle (ARV) for Collision Avoidance in Traffic. B Ulmer. pp. 36-41, 1992.

* cited by examiner

THE BODIES IN THE FRAMES
FROM P1 TO P4 ARE THE OBJECTS

L1:(x3,y3,2)
L2:(x4,y4,2)
L3:(x3,y5,3)
L4:(x7,y3,8)
L5:(x8,y4,7)
L6:(x9,y5,8)
L7:(x9,y6,8)
L8:(x8,y7,8)

OBJECT 1    OBJECT 2

L1:(x3,y3,2,1)
L2:(x4,y4,2,1)
L3:(x3,y5,3,1)
L4:(x7,y3,8,2)
L5:(x8,y4,7,2)
L6:(x9,y5,8,2)
L7:(x9,y6,8,2)
L8:(x8,y7,8,2)

OBJECT LABEL

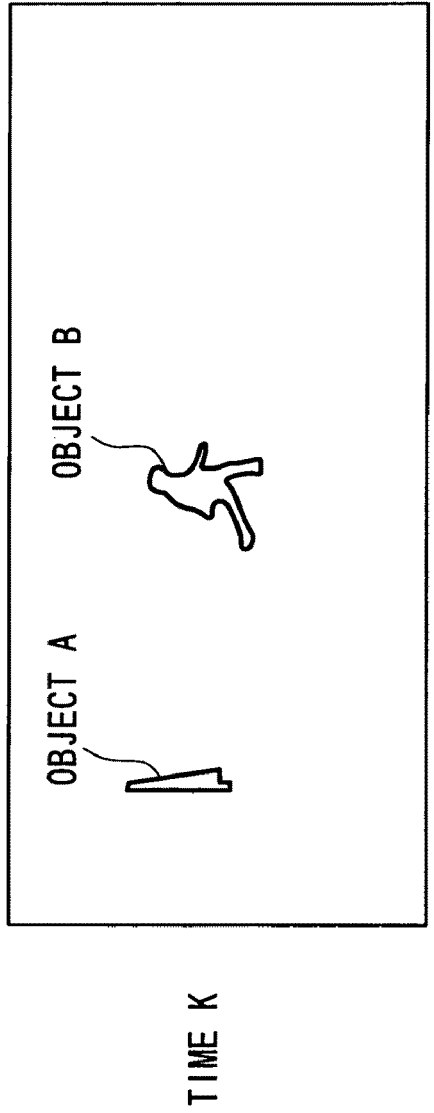
FIG. 6A TIME K
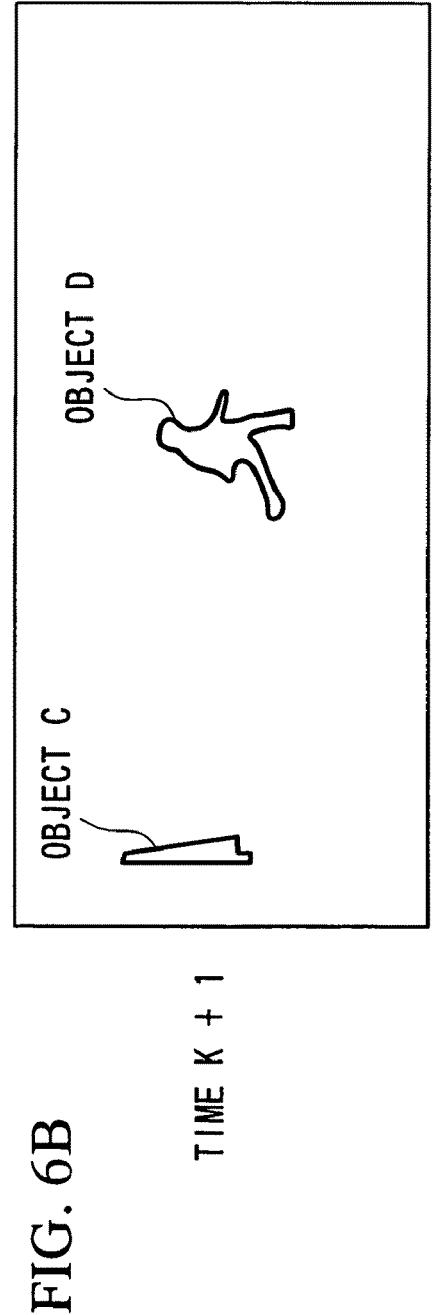
FIG. 6B TIME K + 1

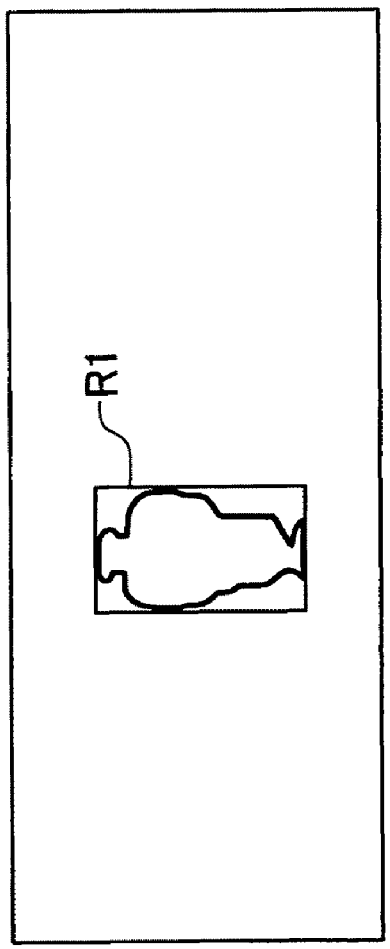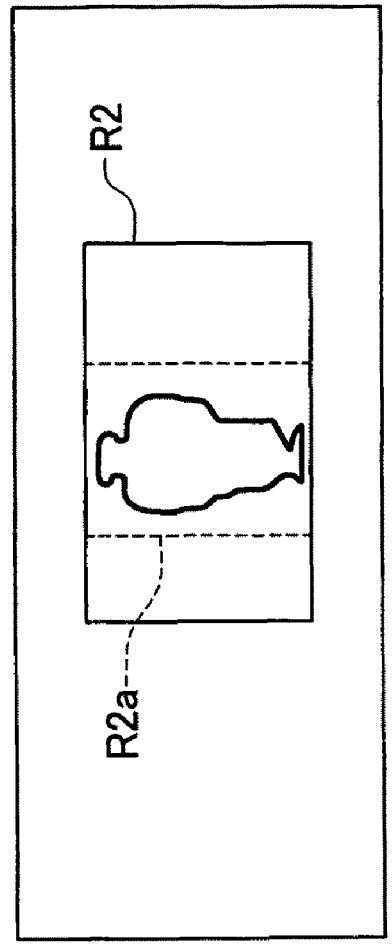
FIG. 8A  RIGHT IMAGE
FIG. 8B  LEFT IMAGE

FIG. 9
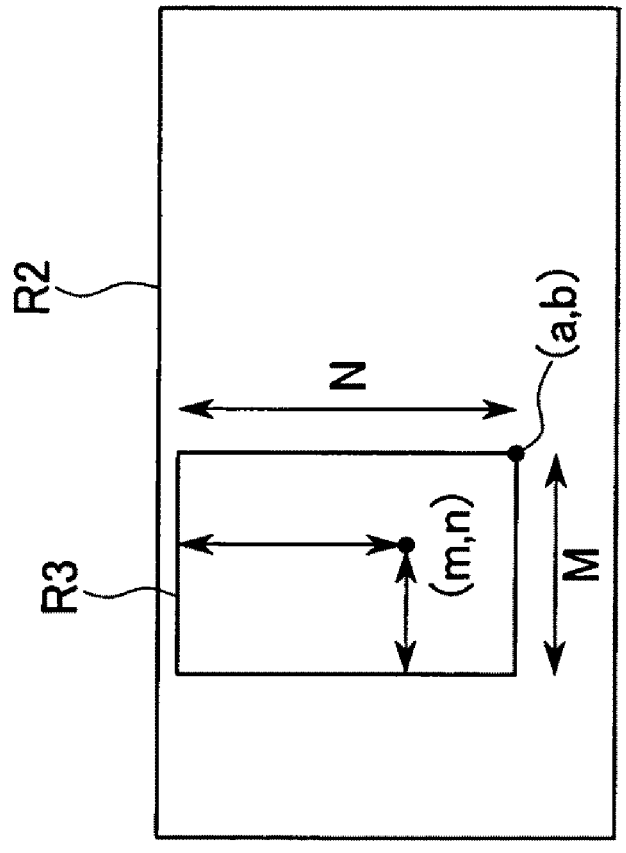
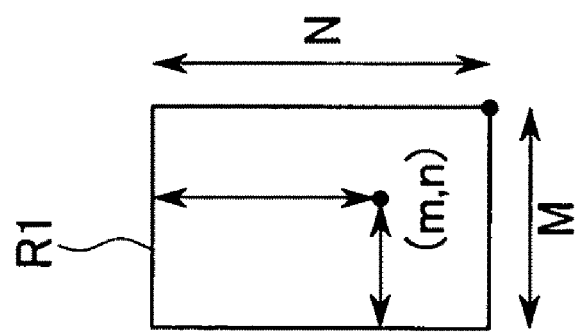

FIG. 10A RIGHT IMAGE

FIG. 10B LEFT IMAGE

FIG. 18A
FIG. 18B
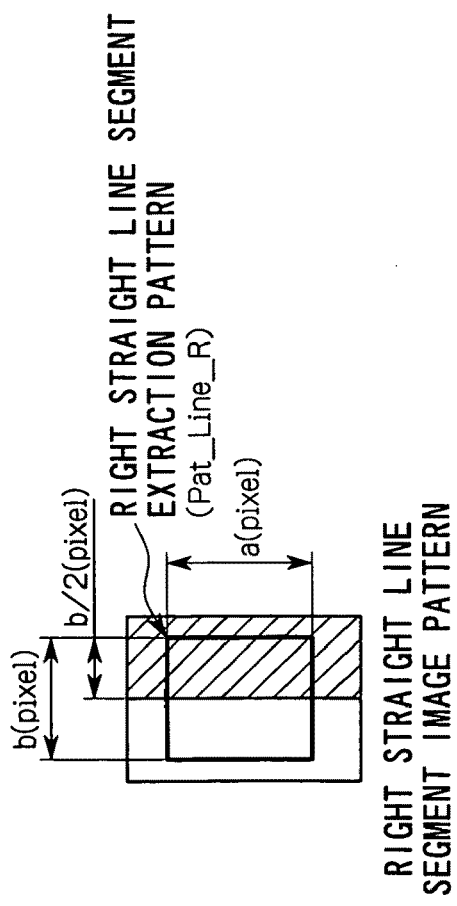

FIG. 21A
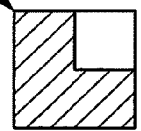
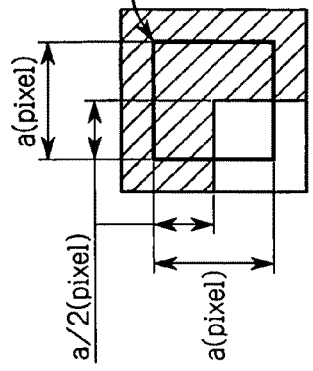
FIG. 21B

FIG. 24B

OBJECT PATTERN (PAT)

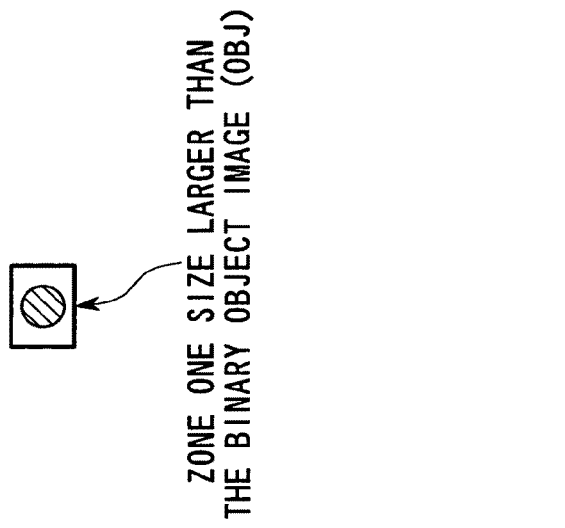

ZONE ONE SIZE LARGER THAN
THE BINARY OBJECT IMAGE (OBJ)

FIG. 24A

SEARCH METHOD

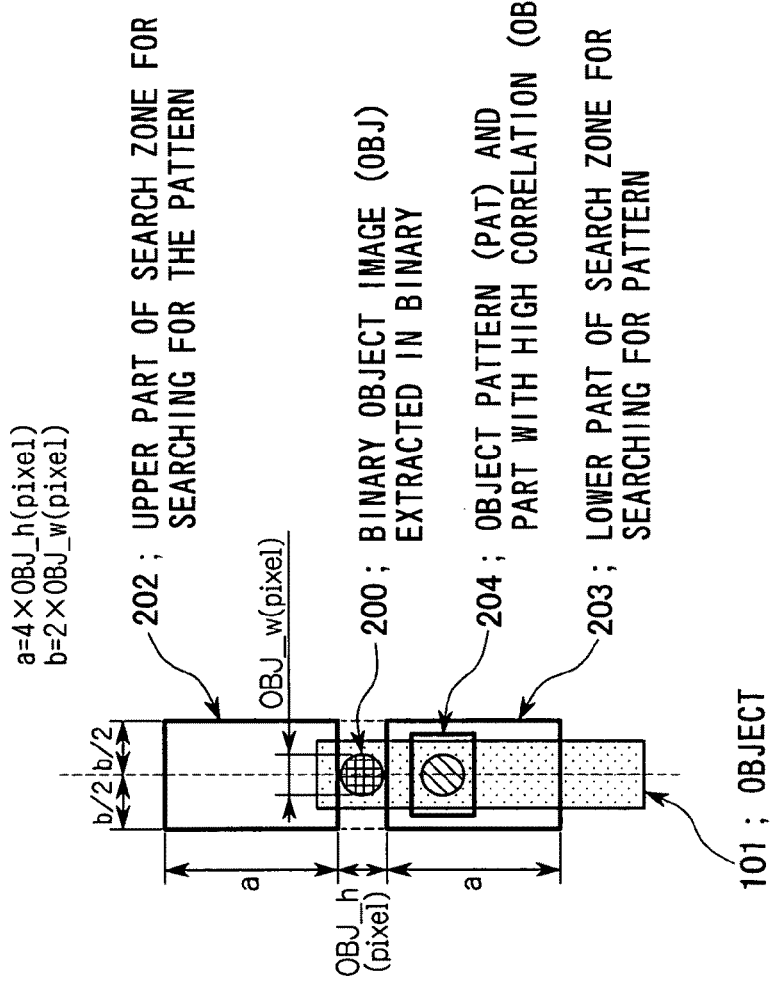

$a = 4 \times OBJ\_h \text{(pixel)}$
$b = 2 \times OBJ\_w \text{(pixel)}$

202 ; UPPER PART OF SEARCH ZONE FOR SEARCHING FOR THE PATTERN

200 ; BINARY OBJECT IMAGE (OBJ) EXTRACTED IN BINARY

204 ; OBJECT PATTERN (PAT) AND PART WITH HIGH CORRELATION (OBJ_PAT)

203 ; LOWER PART OF SEARCH ZONE FOR SEARCHING FOR PATTERN

101 ; OBJECT

VEHICLE ZONE MONITORING APPARATUS

CROSS REFERENCE TO RELATED APPLICATIONS

The present application is a continuation of prior U.S. patent application Ser. No. 10/171,007 filed 12 Jun. 2002, which claims priority under 35 USC 119 based on Japanese Patent Application No. 2001-197312, filed 28 Jun. 2001. The subject matter of each of these priority documents is incorporated by reference herein.

BACKGROUND OF THE INVENTION

1. Field of the Invention

The present invention relates to a vehicle zone monitoring apparatus that detects physical bodies such as other vehicles, pedestrians, and animals that are present in the vicinity of the vehicle.

2. Description of the Related Art

Japanese Unexamined Patent Application, First Publication, No. 2001-6069, is a known example of a zone monitoring apparatus that detects physical bodies present in the vicinity of a vehicle that move, such as pedestrians and animals. This zone monitoring apparatus calculates the distance between the objects in the vicinity of the vehicle and the vehicle from images obtained by two infrared cameras, and then calculates the motion vector of the objects from the position data of the objects found in a time sequence. In addition, the apparatus detects the objects having a high possibility of colliding with the vehicle from the relationship between the direction of progress of the vehicle and the movement vector of the object.

In addition, Japanese Unexamined Patent Application, First Publication, No. 2001-108758, discloses technology in which objects are detected by eliminating zones that exhibit temperatures clearly different from the physical body temperature of a pedestrian from an infrared image photographed by a photographing device provided on the vehicle. In this technology, for objects extracted from portions that eliminate the zone exhibiting a temperature clearly different from the physical body temperature of a pedestrian, the apparatus determines whether or not the object is a pedestrian by further identifying the aspect ratio of the object.

However, in the conventional zone monitoring apparatuses described above, although objects that emit infrared light can be detected, detecting objects besides pedestrians and animals is a problem. These objects include ones that naturally emit heat such as vending machines, the telephone poles and lamp poles that have been heated by exposure to the sun during the day, and have a low importance in terms of the vehicle travel.

In particular, there is the problem that physical bodies that have a temperature approximately the same as the physical body temperature of a pedestrian or have an oblong shape that is the same as that of a pedestrian cannot be distinguished at all from pedestrians.

Furthermore, when pedestrians and animals having indefinite shapes are extracted from the objects by identifying their shape, there is the problem that improving the precision of the detection is difficult.

In consideration of the above problems, it is an object of the present invention to provide a vehicle zone monitoring apparatus that eliminates artificial structures by shape identification using reference images from the infrared image photographed by a photographing device provided on the vehicle, and detects the remaining objects as physical bodies that move, such as pedestrians and animals.

BRIEF SUMMARY OF THE INVENTION

In order to solve the problems described above, a first aspect of the present invention is a vehicle zone monitoring apparatus that detects physical bodies present in the vicinity of the vehicle from infrared images photographed by a photographing device comprises an object extracting device (for example, steps S 1 to S 7 in the embodiments) that extracts objects that emit infrared light from the infrared images, and an artificial structure identifying device (for example, steps S 25 to S 28 and S31 to S39 in the embodiments) that compares an image of a search zone in proximity to said object extracted by said object extraction device, to a reference image of a pre-registered artificial structure which serves as an element that defines an artificial structure, and that identifies said object as an artificial structure if: within said search zone in proximity to said object, a section having a high correlation with said reference image exists; and a distance between said vehicle and said object is equal to a distance between said vehicle and said section having the high correlation with said reference image.

Due to the structure described above, for a plurality of heat-emitting physical bodies present in the infrared images photographed by the photographing device, an image of a search zone in proximity to said object extracted by said object extraction device and a reference image are compared, and distinguishing whether the physical body is an artificial structure having a determined shape or a physical body other than this, for example, one that moves, such as a pedestrian or animal becomes possible where, within the search zone in proximity to the object, a section having a high correlation with said reference image exists; and the distance between said vehicle and said object is equal to the distance between said vehicle and said section having the high correlation with said reference image.

In the vehicle zone monitoring apparatus of the first aspect, a second aspect of the present invention is characterized in comprising an artificial structure eliminating device (for example, step S 30 in the embodiments) that eliminates the objects identified to be artificial structures using the artificial structure identifying device from the objects extracted by the object extracting device.

Due to the structure described above, in order to extract objects other than artificial structures, which should receive attention, artificial structures are eliminated from the objects extracted from the infrared images, and the remaining objects can be recognized as moving physical bodies.

In the vehicle zone monitoring apparatus of the first and second aspect, a third aspect of the present invention is characterized in that said reference images include an image representing a line segment, and said artificial structure identifying device identifies objects that includes a vertical line segment or a right angle segment.

Due to the structure described above, by identifying whether or not there is a vertical straight line segment or a right angle segment, which easily characterizes artificial structures in the objects, objects having straight line segments can be eliminated as artificial structures, and objects other than artificial objects can be recognized.

In the vehicle zone monitoring apparatus of the first through third aspects, a fourth aspect of the invention is characterized in that said artificial structure identifying device comprises a reference image dimension altering device (for example, steps S 32, S 52, and S 72 in the embodiment) that alters the size of said reference image so as to conform to the distance between said vehicle and said object.

Due to the structure described above, by complementing the differences in size between the object image and the reference image that occur due to the distance between the object and the vehicle and referring to both using an appropriate size, the precision in detecting whether or not an object is an artificial structure can be improved.

BRIEF DESCRIPTION OF THE DRAWINGS

FIGS. 6A and 6B are drawings showing the time trace of the object.

FIGS. 8A and 8B are drawings showing the search image in the right image and the search zone set in the left image.

FIG. 9 is a drawing showing the correlation calculation processing that uses the search zone as an object.

FIGS. 18A and 18B are drawings showing the details of the vertical linear part extracted pattern in the search of the image.

FIGS. 21A and 21B are drawings showing the details of the quadrangle part extracted pattern in the search of the image.

FIGS. 24A and 24B are drawings showing the search of the object pattern for detecting identical shapes.

DETAILED DESCRIPTION OF THE INVENTION

Below, an embodiment of the present invention will be explained with reference to the figures.

Figure 1:
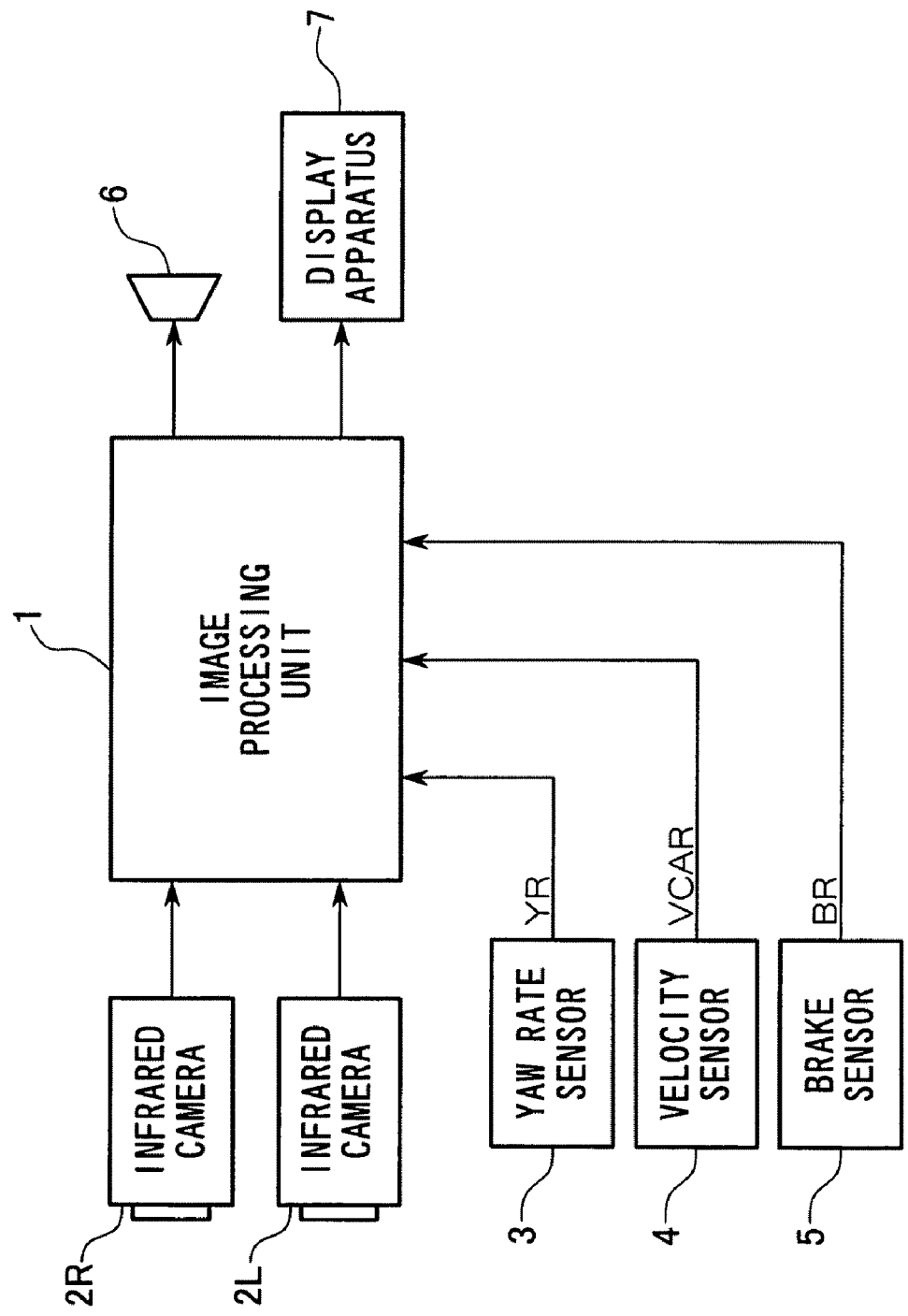
FIG. 1 is a block diagram showing the structure of the vehicle zone monitoring apparatus according to the embodiment of the present invention.

FIG. 1 is a block diagram showing the structure of the vehicle zone monitoring apparatus according to the embodiment of the present invention.

In FIG. 1, reference numeral 1 is an image processing unit that provides a CPU (Central Processing System) that controls the vehicle zone monitoring apparatus of this embodiment, and has connected thereto two infrared cameras 2R and 2L that can detect infrared light, a yaw rate sensor 3 that detects the oscillation of this vehicle physical body, a velocity sensor 4 that detects the traveling velocity (vehicle velocity) of this vehicle, and a brake sensor 5 for detecting the operation of the brake. Thereby, the image processing unit 1 detects an object that moves, such as a pedestrian or animal, in front of the vehicle from signals representing the infrared image in the vicinity of the vehicle and the travel state of the vehicle, and determines when the possibility of a collision is high.

Connected to the image processing unit 1 are a speaker 6 that issues a warning by voice, and, for example, a meter display that integrates a meter that numerically represents the travel state of the vehicle, a NAVIDisplay disposed on the console of the vehicle, or a HUD (Head Up Display) that displays information on the front window at a position that does not interfere with the forward view of the driver, in order to notify the driver of the vehicle about objects with which the danger of a collision is high.

In addition, the image processing unit 1 comprises an A/D conversion circuit that converts an input analog signal into a digital signal, an image memory that stores digitalized image signal, a CPU (Central Processing Unit) that carries out each type of operation processing, RAM (Random Access Memory) used in order to store data that the CPU is currently processing, ROM (Read Only Memory) that stores programs executed by the CPU, tables, maps and the like, and the like, a driving signal for the speaker 6, and an output circuit that outputs display signals and the like of the HUD 7a, for example, and is structured such that each of the output signals of the infrared cameras 2R and 2L, the yaw rate sensor 3, the velocity sensor 4, the and the brake sensors 5 are converted to digital signals and input into the CPU.

Figure 2:
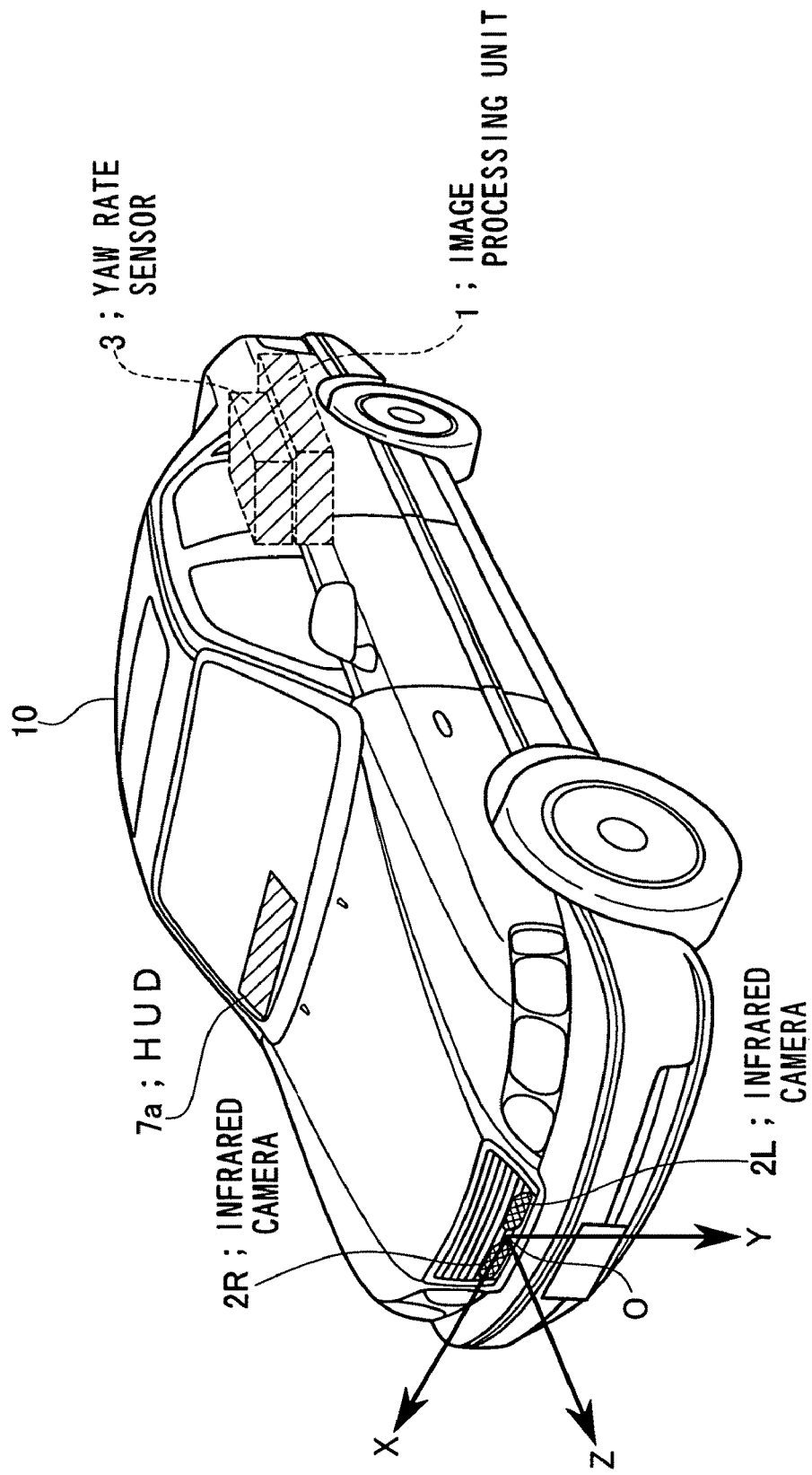
FIG. 2 is a drawing showing the installation positions of the infrared cameras, sensors, display and the like in the vehicle.

In addition, as shown in FIG. 2, on the front of the vehicle 10, the infrared cameras 2R and 2L are disposed at substantially symmetrical positions with respect to the center part in the transverse direction of the vehicle 10, and the optical axes of the two infrared cameras 2R and 2L are parallel to each other. In addition, the height of both cameras from the surface of the road surface is fixed so as to be equal. Moreover, the infrared cameras 2R and 2L have the property that the output signal level increases (the brightness increases) as the temperature of the object increases.

In addition, the HUD 7a is provided so that the display image is displayed at a position on the front window of the vehicle 10 that does not block the forward visual horizon of the driver.

Next, the operation of this embodiment will be explained with reference to the figures.

Figure 3:
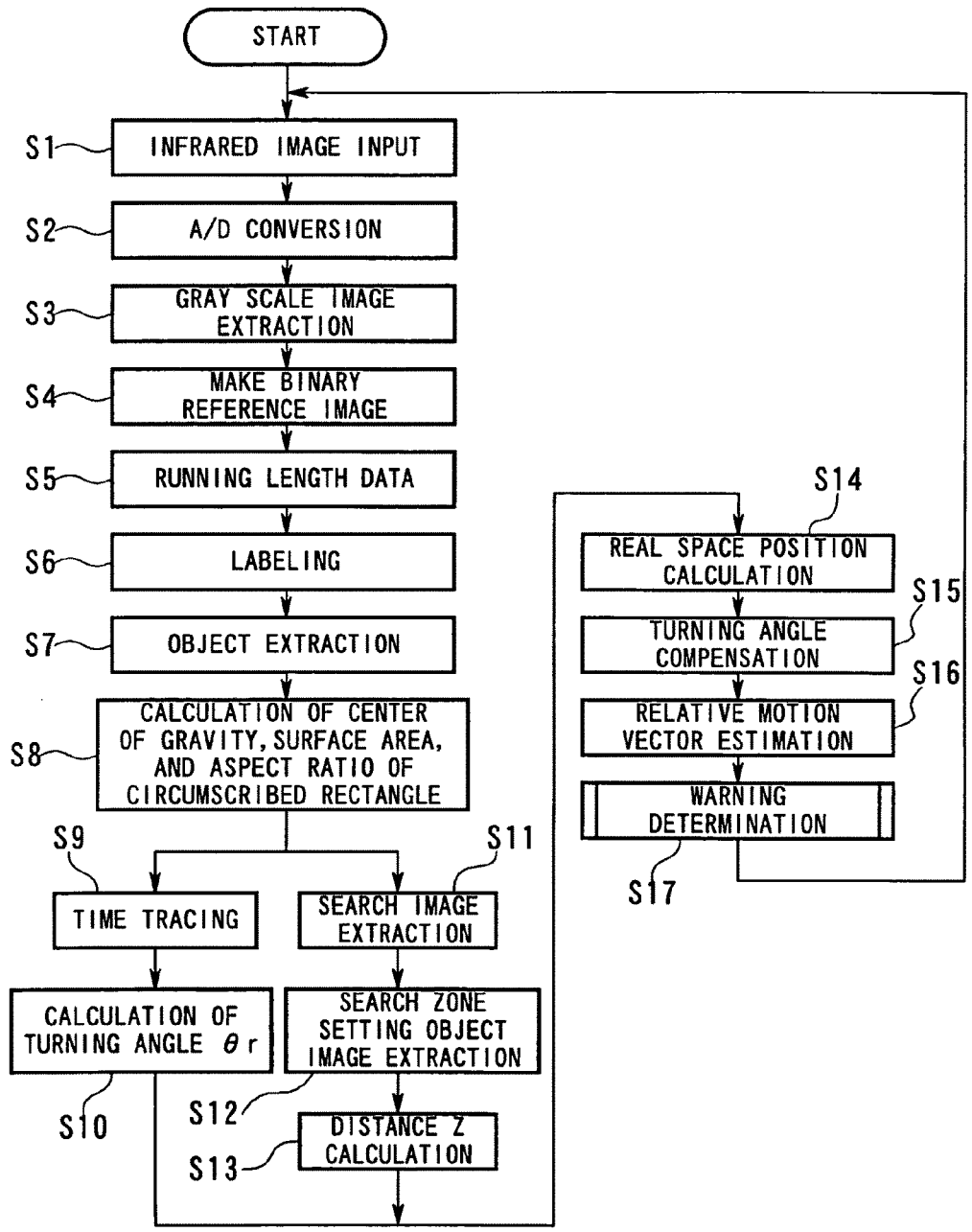
FIG. 3 is a flowchart showing the processing sequence for all operations in the image processing unit of the vehicle zone monitoring apparatus of this embodiment.

FIG. 3 is a flowchart showing the processing sequence in the image processing unit 1 of the vehicle zone monitoring apparatus of this embodiment.

First, the image processing unit 1 obtains an infrared image, which is the output signal of the infrared cameras 2R and 2L (step S 1), carries out A/D conversion thereon (step S 2), and stores the gray scale image in the image memory (step S 3). Moreover, the right image from the infrared camera R2 is obtained, and then the left image from the infrared camera 2L is obtained. In addition, in the right image and the left image, the horizontal position on the display screen of the same object is displayed with an offset, and thus, by this offset (parallax), the distance to this object can be calculated.

Next, the right image obtained by the infrared camera R2 serves as the reference image, the binary processing of this signal image, that is, the processing, in which the zones brighter than a brightness threshold ITH are assigned "1" (white) and the dark zones are assigned "0" (black), is carried out (step S 4).

Figure 4A:
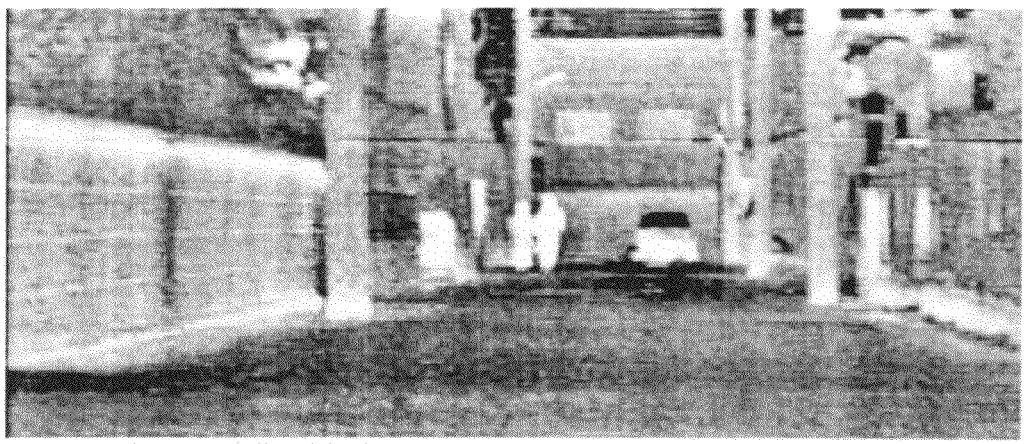
FIG. 4A and FIG. 4B are drawings showing the gray scales obtained by the infrared camera and the binary image thereof.
Figure 4B:
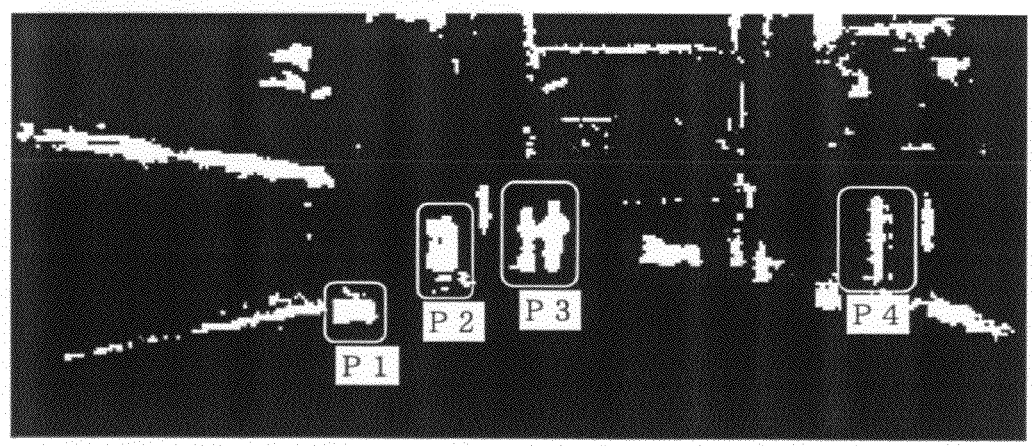

FIG. 4A shows the gray scale image obtained from the infrared camera 2R, and by carrying out binary processing thereon, the image in FIG. 4B is obtained. Moreover, in FIG. 4B, the physical bodies surrounded by the frames P1 to P4 are set as the objects displayed in white on the display screen (below, referred to as the "high brightness zone").

When the image data that has undergone binary processing has been obtained from the infrared camera, processing is carried out in which the binary image data is converted to run length data (step S 5).

Figure 5A:
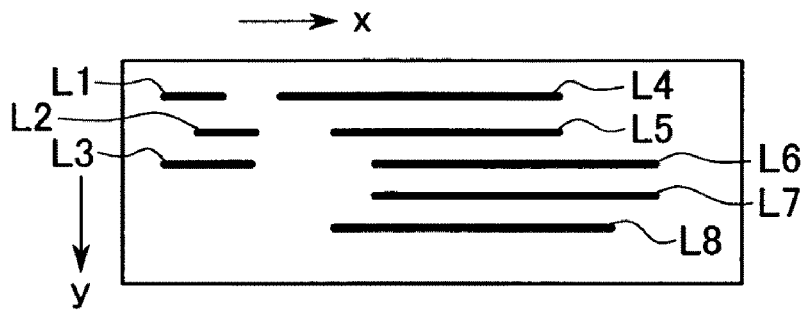
FIG. 5A, FIG. 5B, and FIG. 5C are drawings showing the conversion processing and labeling for the run length data.

FIG. 5A is a drawing to explain this, and in this figure the zone that has become white due to binary conversion is shown as the lines L1 to L8. Lines L1 to L8 all have a width of 1 pixel in the y direction, and while they are actually arranged without a space between them in the y direction, they have been separated for the sake of the explanation. In addition, the lines L1 to L8 respectively have the lengths 2 pixels, 2 pixels, 3 pixels, 8 pixels, 7 pixels, 8 pixels, 8 pixels, and 8 pixels. The run length data is shown by the coordinates of the start point of each of the lines (the point on the left end of each line) and the length (number of pixels) from the start point to the end point (the point on the right end of each line). For example, line L3 comprises the 3 pixels (x3, y5), (x4, y5), and (x5, y5), and thus (x3, y5, 3) becomes the run length data.

Figure 5B:
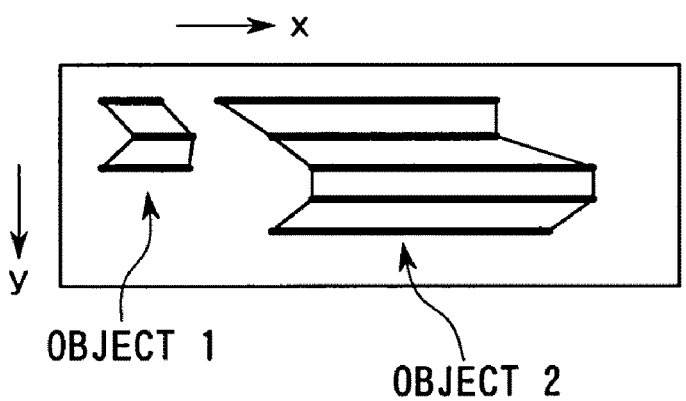

Next, from the image data converted into run length data, by labeling the object (step S 6), the processing in which the object is extracted is carried out (step S7). That is, as shown in FIG. 5B, among the lines L1 to L8 that have been converted to run length data, the lines L1 to L3, which are the parts overlapping in the y direction, are treated as one object 1, lines L4 to L8 are treated as one object 2, and the object labels 1 and 2 are added to the run length data. By this processing, for example, the high brightness zones shown in FIG. 4B are respectively recognized as objects 1 through 4.

Figure 5C:
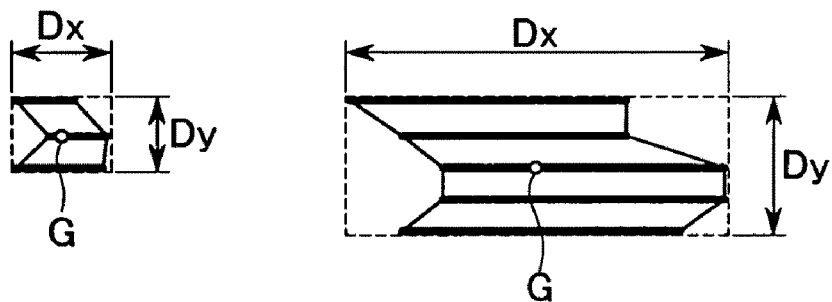

When the extraction of the objects has completed, as shown in FIG. 5C, next the center of gravity G, surface area S, and the aspect ratio ASPECT of the circumscribed quadrangle represented by the broken lines is calculated (step S 8).

Here, the surface area S is calculated by adding the lengths of the run length data for the same object. In addition, the coordinate of the center of gravity G is calculated as the x coordinate of the line that bisects the surface area S in the x direction, and the y coordinate of the line that bisects it in the y direction. Furthermore, the aspect ratio ASPECT is calculated as the Dy/Dx ratio of Dy and Dx shown in FIG. 5C. Moreover, the position of the center of gravity G can be substituted for by the position of the center of gravity of the circumscribed quadrangle.

When the center of gravity, the surface area, and the aspect ratio of the circumscribed quadrangle have been calculated, next recognition of the time trace, that is, the sampling of each cycle, of the same object us carried out (step S 9). In a time trace, k serves as the time during which time t, an analogue amount, is made discrete at a sampling cycle, and as shown in FIG. 6A, in the case that objects A and B are extracted at time k, objects C and D extracted at time (k+1) are determined to be identical to objects A and B. Specifically, when the following identity determination conditions 1 to 3 are satisfied, objects A and B are determined to be identical to objects C and D, and objects C and D have their labels changed respectively to objects A and B.

When the position coordinates of the center of gravity in the image of the object i (=A, B) at time k are set respectively to (xi (k), yi (k)) and the position coordinates of the center of gravity in the image of the object j (=C, D) at time (k+1) are set respectively to (xj (k+1), yj (k+1)), then |xj (k+1)−xi (k)|<Δx|yj (k+1)−yi (k)|<Δy, where Δx and Δy denote the allowable values of the amount of movement in the picture respectively in the x direction and the y direction.

2) When the surface area of the object i (=A, B) in the image at time k is Si (k) and the surface area of the object j (=C, D) in the image at time (k+1) is Sj (k+1), then Sj (k+1)/Si (k)<1±ΔS, where ΔS denotes the allowable values of the change in area.

3) When the aspect ratio of the circumscribed quadrangle of the object i (=A, B) at time k is ASPECT i (k) and the aspect ratio of the circumscribed quadrangle of the object j (=C, D) is ASPECT j (k+1), then ASPECT j (k+1)/ASPECT i (k)<1±ΔASPECT, where ΔASPECT denotes the allowable values of the aspect ratio.

For example, when comparing FIG. 6A and FIG. 6B, although the size of each of the objects in the image becomes larger, the object A and the object C satisfy the conditions for the identification of identity described above and the object B and the object D satisfy the conditions for the identification of identity described above, and thus the objects C and D are respectively recognized to be the objects A and B. In this manner, the positions coordinates (of the center of gravity) of each of the recognized objects is stored in the memory as time series position data to be used on later calculation processing.

Moreover, the processing in steps S 4 to S 9 explained above is carried out on a binary reference image (in this embodiment, the right image).

Figure 7:
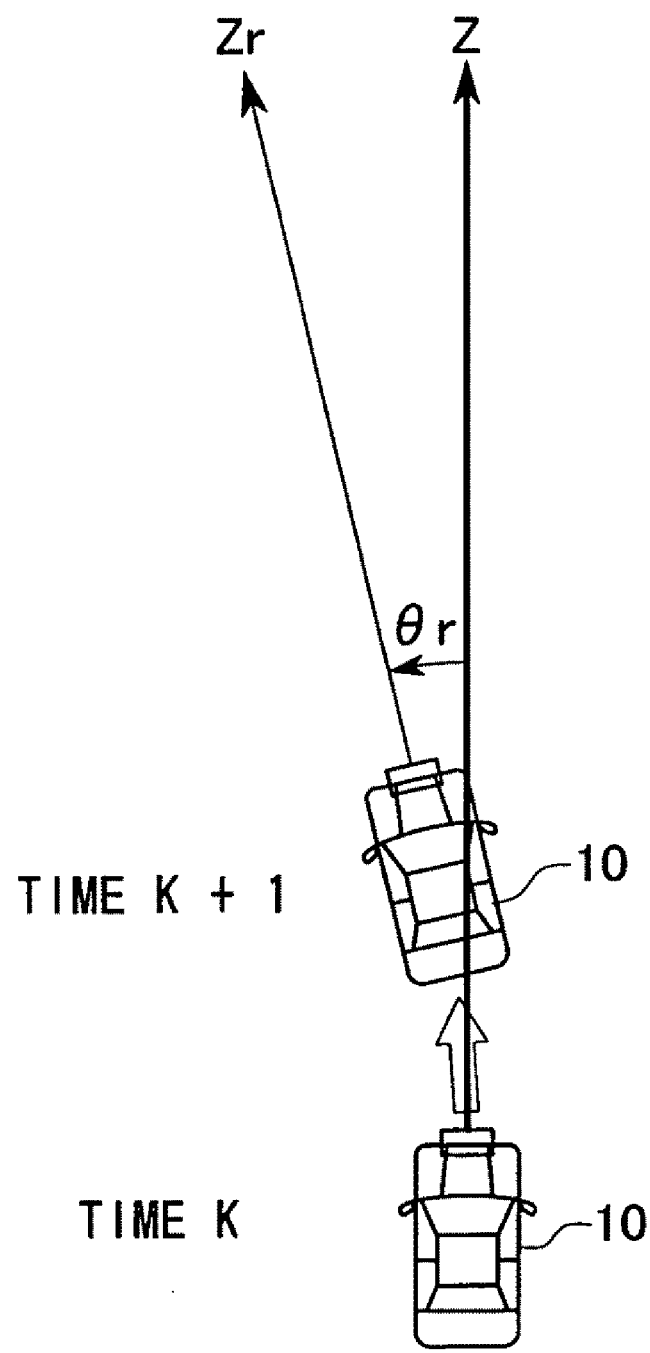
FIG. 7 is a drawing showing the turning angle compensation of the object image.

Next, the velocity VCAR detected by the velocity sensor 4 and the yaw rate YR detected by the yaw rate sensor 3 are read, and as shown in FIG. 7, the turning angle θr of the vehicle 10 is calculated by integrating the yaw rate YR with respect to time (step S 10).

In contrast, the processing of step S 9 and step S 10 is carried out in parallel, and in steps S 11 through S 13, processing that calculates the distance z between the object and the vehicle 10 is carried out. Because this calculation requires a longer time than step S 9 and step S 10, they are executed at a longer cycle than step S 9 and S 10 (for example, at a cycle about three times the execution cycle of steps S 1 to S 10).

First, by selecting one among the objects that is traced out by the binary image of the reference object (the right image), as shown in FIG. 8A, in the search image R1 (here, the entire area surrounded by the circumscribed quadrangle is made the searched image) is extracted from the right image (step S 11).

Next, the vehicle search zone in which the image corresponding to the searched image (below, referred to as the "corresponding image") from the left image is set, and the corresponding image is extracted by executing the correlation calculation (step S 12). Specifically, as shown in FIG. 8B, depending on each of the peak coordinates of the searched image R1, the searched zone R2 in the left image is set, and the brightness difference total value C (a, b), which indicates the degree of the correlation with the searched image R1 in the searched zone R2, is calculated by the Eq. 1 shown below, and the zone in which this total value C (a, b) becomes minimum is extracted as the corresponding image. Note that this correlation calculation is carried out using the gray scale image, not the binary image.

In addition, when there is past position data for the identical physical body, based on this position data, a zone R2a (shown by the broken line in FIG. 8B) that is narrower than the searched zone R2 is set to serve as the search zone.

$$C(a, b) = \sum_{n=0}^{N-1} \sum_{m=0}^{M-1} |IL(a+m-M, b+n-N) - IR(m, n)| \qquad \text{Eq. 1}$$

Here, IR (m, n) is the brightness value of the position of the coordinate (m, n) in the searched zone R1 shown in FIG. 9 and IL (a+m−M, b+n−N) is the brightness value of the position of the coordinate (m, n) in the search one R1 and the local zone R3 having the same shape, where the coordinates (a, b) in the search zone are the base points. The position of the corresponding image is defined by finding the position at which the total value C (a, b) of the brightness difference is minimized by changing the coordinates (a, b) of the base point.

Figure 10:
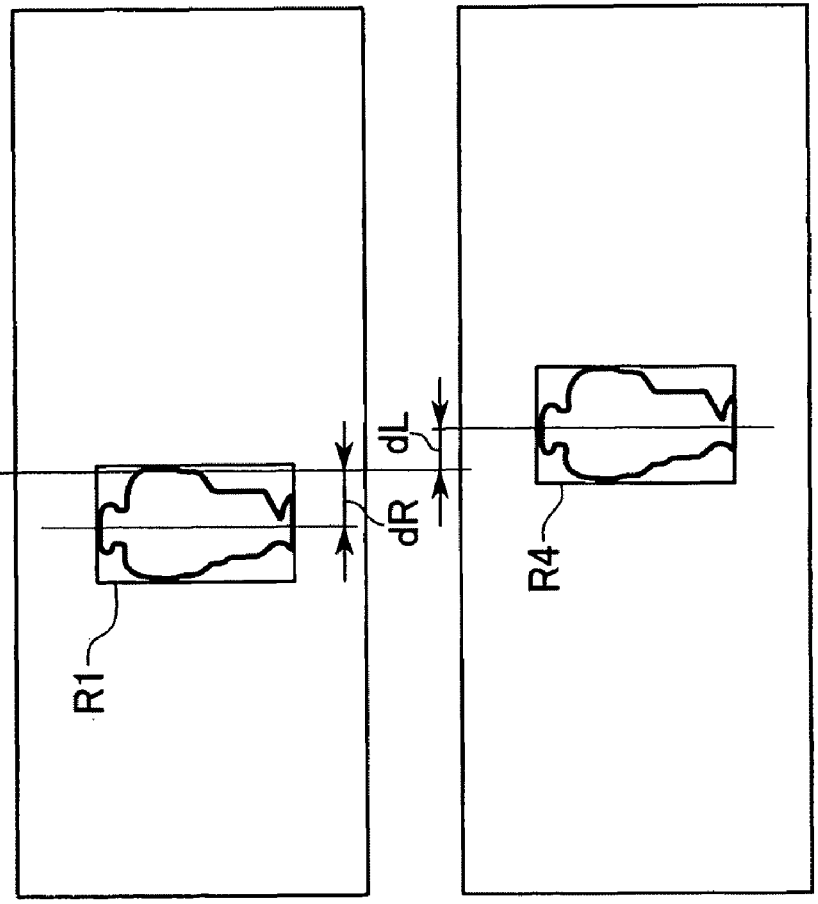
FIGS. 10A and 10B are drawings showing the calculation method for object parallax in the distance calculation of the object.

Due to the processing in step S 12, as shown in FIG. 10A and FIG. 10B, because the searched image R1 and the corresponding image R4 corresponding to this object are extracted, next the distance dR (number of pixels) between the position of the center of gravity of the searched image R1 and the image center line LCTR and the distance dL (number of pixels) between the position of the center of gravity of the corresponding image R4 and the image center line LCTR are found, and by applying the following Eq. 2, the distance z between the vehicle 10 and the object is calculated (step S 13).

$$z = \frac{B \times F}{(dL+dR) \times p} = \frac{B \times F}{\Delta d \times p} \qquad \text{Eq. 2}$$

Here, B is the base line length, that is, the distance in the horizontal direction between the center position of the photographic element of the infrared camera 2R and the center position of the photographic element of the infrared camera 2L (the separation of the light beam axis of both infrared cameras); F is the focal distance of the lenses of the infrared cameras 2R and 2L, p is the pixel separation in the photographic element of the infrared cameras 2R and 2L, and Δd (=dR+dL) is the amount of parallax.

When the calculation of the turning angle θr in step S 10 and the calculation of the distance to the object in step S 13 have completed, the coordinates (x, y) in the image and the distance z calculated by Eq. 2 are applied to the following Eq. 3, and converted to real spatial coordinates (X, Y, Z) (step S 14).

Here, as shown in FIG. 2, the real spatial coordinates (X, Y, Z) have as their origin O the position of the center point of the installation position of the infrared cameras 2R and 2L (the position at which they are fixed on the vehicle 10), they are fixed as shown in the figure, and the coordinates in the image are determined by x in the horizontal direction and y in the vertical direction, where the center of the image serves as the origin.

$$\begin{bmatrix} X \\ Y \\ Z \end{bmatrix} = \begin{bmatrix} xc \times z/f \\ yc \times z/f \\ z \end{bmatrix} \qquad \text{Eq. 3}$$

where f=F/p.

Here, (xc, yc) are the coordinates (x, y) of the right image that have been converted to coordinates of a virtual image in which the real spatial origin O and the center of the image have been made to coincide based on the relative positional relationship between the installation position of the infrared camera 2R and the real special origin O. In addition, f is the ratio of the focus distance F and the pixel interval p.

In addition, when the real spatial coordinates have been found, turning angle compensation is carried out in order to compensate the positional shift in the image due to the turning of the vehicle 10 (step S 15).

Figure 11:
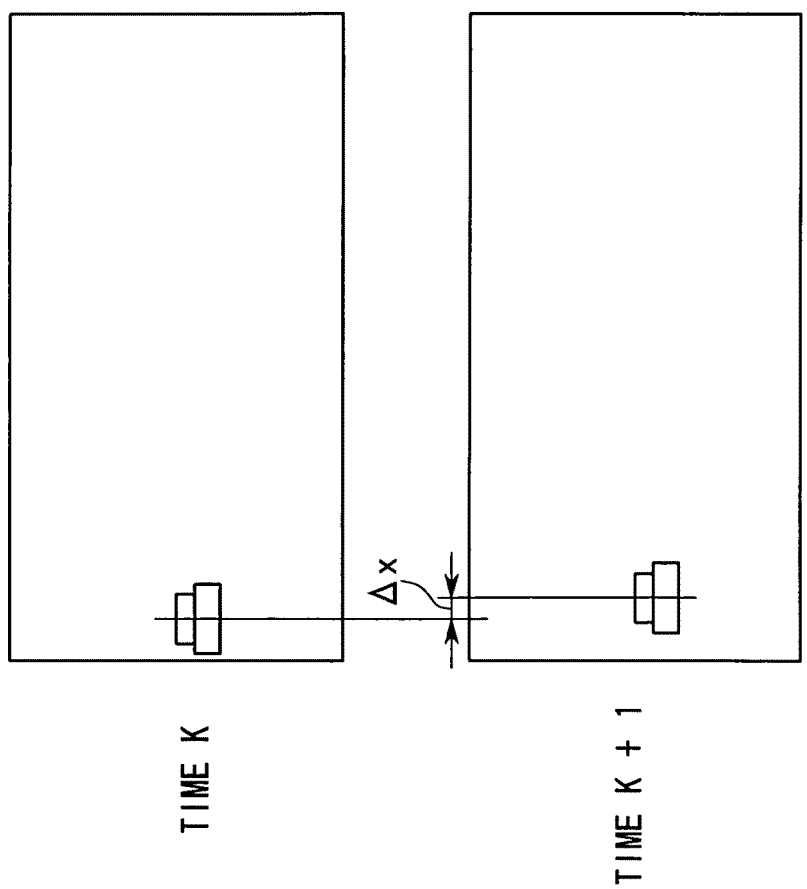
FIG. 11 is a drawing showing the offset of the object position in the image generated by the turning of the vehicle.

As shown in FIG. 7, when the vehicle turns, for example, at a turning angle θr in the left direction during the time interval from time k to (k+1), a shift in the x direction by an amount equivalent to Δx, as shown in FIG. 11, occurs in the image obtained by the camera, and the turning angle compensation is a process to compensate this. Specifically, in the following Eq. 4, the real spatial coordinate system (X, Y, Z) is applied, and the compensated coordinates (Xr, Yr, Zr) are calculated. The calculated real spatial position data (Xr, Yr, Zr) is associated with each object and stored in memory. Moreover, in the following explanation, the coordinates after turning angle compensation are denoted (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \qquad \text{Eq. 4}$$

When the turning angle compensation for the real coordinates has completed, next, the approximately straight line LMV corresponding to the relative motion vector between the object and the vehicle 10 is found from N real spatial position data (for example, N=10) after turning angle compensation obtained during the monitoring period ΔT for one and the same object, that is from the time series data, (step S 16).

Concretely, when the direction vector L, which denotes the direction of the approximately straight line LMV, is equal to (lx, ly, lz) where (|L|=1), the straight line represented by the following Eq. 5 is found.

$$X = u \cdot lx + Xav \qquad \text{Eq. 5}$$
$$Y = u \cdot ly + Yav$$
$$Z = u \cdot lz + Zav$$
$$Xav = \sum_{j=0}^{N-1} X(j)/N$$
$$Yav = \sum_{j=0}^{N-1} Y(j)/N$$
$$Zav = \sum_{j=0}^{N-1} Z(j)/N$$

Here, u is a parameter that takes an arbitrary value, and Xav, Yav, and Zav are respectively the average values of the X coordinate, Y coordinate, and Z coordinate of the real spatial position data sequence.

Moreover, when the parameter u is eliminated, Eq. 5 becomes to Eq. 5a:

$$(X-Xav)/lx=(Y-Yav)/ly=(Z-Zav)/lz \qquad \text{Eq. 5a}$$

In addition, in the case, for example, that P(0), P(1), P(2), ..., P(n−2), P(N−1) denote the time series data after turning angle compensation, the approximately straight line LMV passes through the average position coordinate Pav=(Zav, Yav, Zav) of the time sequence data, and is found as the straight line which is characterized in that the average value of the square of the distance from each of the data points is minimal.

Here, the numerical value in the parenthesis added to P, which denotes the coordinates of each of the data point, indicates that the larger the value, the older the data. For example, P(0) denotes the most recent position coordinate, P(1) denotes the position coordinate of one sample cycle back, and P(2) denotes the position coordinate two sample cycles back.

Next, when the most recent position coordinate P(0)=(X(0), Y(0), Z(0)), the position coordinate P (N−1)=(X (N−1), Y(N−1), Z(N−1)) of the (N−1) sample back (before time ΔT) is compensated to a position on the approximately straight line LMV. Concretely, by applying the Z coordinates Z(0), Z(N−1) to the Eq. 5a above, that is, the following Eq. 6, the position coordinates after compensation Pv(O)=(Xv (0), Yv (0), Zv(0)) and Pv (N−1)=(Xv(N−1), Yv(N−1), Zv(N−1)) are found.

$$Xv(j) = (Z(j) - Zav) \times \frac{lx}{lz} - Xav \qquad \text{Eq. 6}$$
$$Yv(j) = (Z(j) - Zav) \times \frac{ly}{lz} - Yav$$
$$Zv(j) = Z(j)$$
$$j = 0, N-1$$

The relative motion vector is found as the vector from the position coordinate Pv(N−1) calculated in Eq. 8 towards Pv(0).

By finding the relative motion vector by calculating the approximately straight line that approximates the relative motion locus of the object with respect to the vehicle 10 from a plurality (N) of data within the monitoring period ΔT in this manner, the influence of position detection error can be reduced, and the possibility of a collision with the object can be more correctly predicted.

In addition, in step S 16, when the relative motion vector has been found, next the possibility of a collision with the detected object is determined, and a warning determination process, which issues a warning when the possibility is high, is executed (step S 17).

Moreover, when the warning determination process has been completed, the flow returns to step S1, and the above processing is repeated.

Next, the warning determination process in step S 17 of the flowchart shown in FIG. 3 will be explained with reference to the flowchart shown in FIG. 12.

Figure 14:
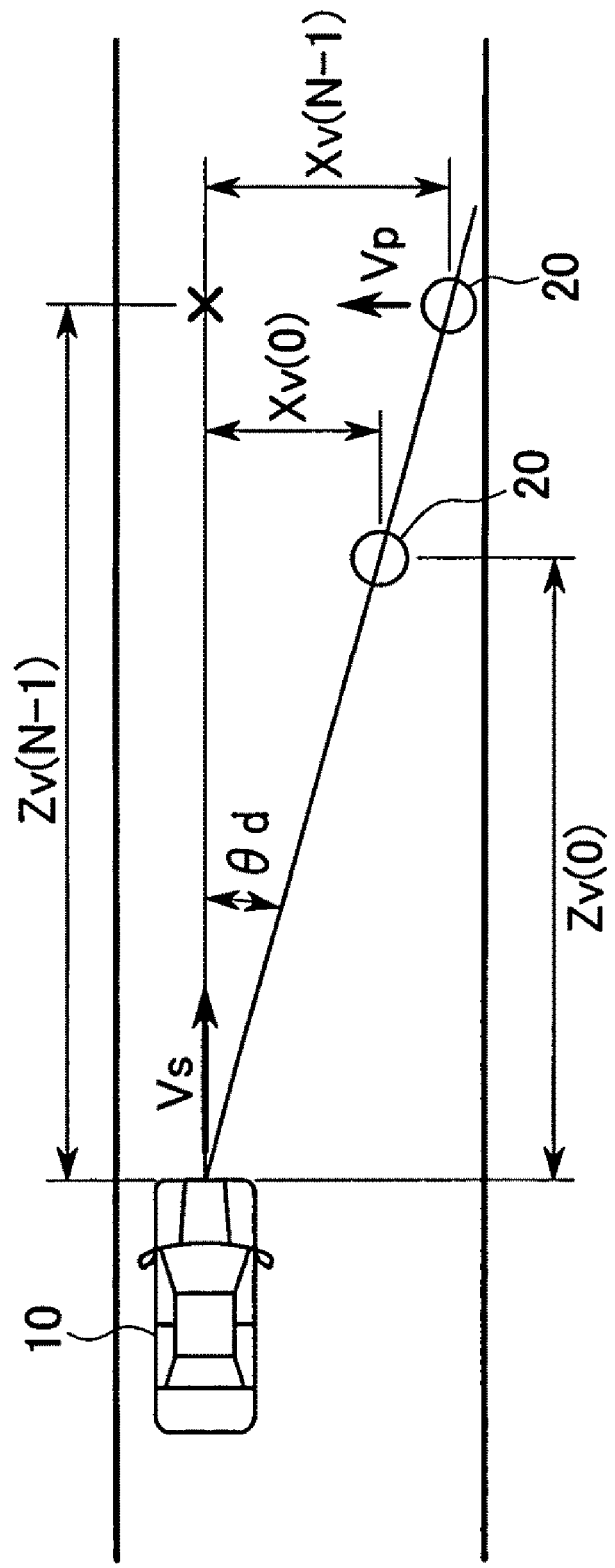
FIG. 14 is a drawing showing the case in which a collision can occur easily.

Here, as shown in FIG. 14, the case in which there is an animal 20 progressing at a velocity Vp in a direction that is at an angle of approximately 90° with respect to the direction of progress of the vehicle 10 will be used as an example to be explained.

First, the image processing unit 1 calculates the relative velocity Vs in the Z direction using the following Eq. 7 from the animal 20 approaching the distance Zv (0) from the distance Zv (N−1) during the time ΔT, and carries out collision determination processing (step S 21). The collision determination processing is processing that determines whether there is a possibility of a collision when the following Equations 8 and 9 are satisfied.

In step S 21, in the case it has been determined that there is a possibility of a collision with the animal 20 (YES in step S 21), the flow proceeds next to step S 22.

In addition, in step S 21, when Eq. 8 and/or Eq. 9 are not satisfied, it is determined that there is no possibility of a collision with the animal 20 (NO in step S 21), and the warning determination processing completes.

$$Vs=(Zv(N-a)-Zv(0))/\Delta T \qquad \text{Eq.7}$$

$$Zv(0)/Vs \leq T \qquad \text{Eq. 8}$$

$$|Yv(0)| \leq H \qquad \text{Eq. 9}$$

Here, Zv(0) is the most recent distance detection value (v is attached in order to indicate that this is data after compensation using the approximately straight line LMV, while the Z coordinate is a value identical to that before compensation), and Zv(N−1) is the detected distance value before the time ΔT. In addition, T is an allowable time and signifies that the possibility of a collision is determined time T before the predicted collision time, and is about 2 to 5 seconds, for example. In addition, H is a predetermined height that defines the range of the Y direction, that is the height direction, and is set, for example, to about twice the height of the vehicle 10.

Figure 13:
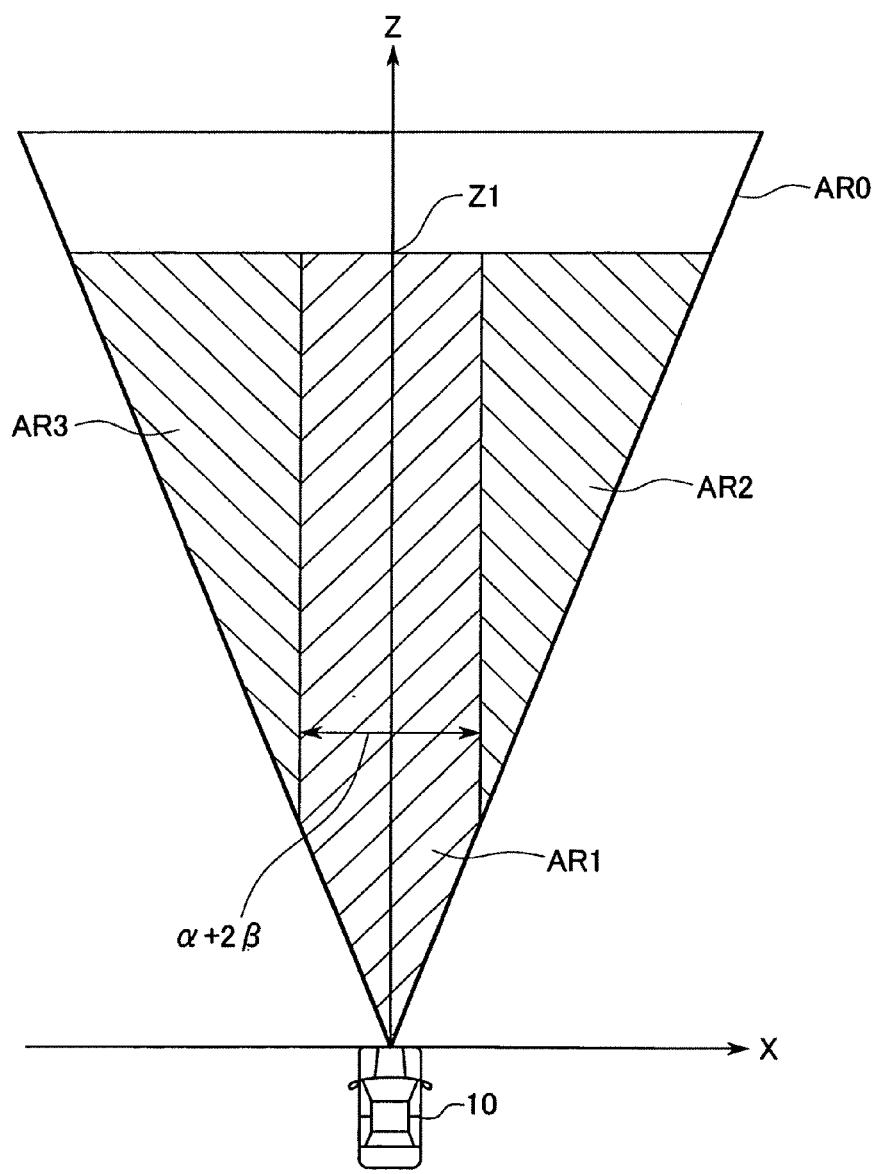
FIG. 13 is a drawing showing the zone partition in the forward direction of the vehicle.

When the collision determination processing has completed, next it is determined whether or not the object is within the approach zone determination (step S 22). For example, in FIG. 13, the zone that can be monitored by the infrared cameras 2R and 2L is indicated by the area AR0 in the circumscribed triangle indicated by the bold solid line, and zones AR1, AR2, and AR3 in the zone AR0, which are closer to the vehicle 10 than Z1=Vs×T serve as the warning zones.

Here, AR1 is the zone corresponding to the range having added the allowance β (for example, about 50 to 100 cm) to both sides of the width α of the vehicle 10, or in other words, the zone having a width (α/2+β) on both sides of the axle at the center part in the width direction of vehicle 10, and if the object continues to be present as-is, the possibility of a collision is extremely high. Thus, these zones are called approach determination zones. The zones AR2 and AR3 are zones (in the outside transverse direction of the approach determination zone) in which the absolute value of the X coordinate is larger than the approach determination zone, an invasive collision determination, described below, is made about the object inside this zone, and thus this is called the invasive determination zone. Moreover, these zones have a predetermined height H in the Y direction, as shown in the above Eq. 9.

The answer in the above step S 21 becomes affirmative (YES) in the case that an object is present in either the approaching determination zone AR1 or the invasive determination zones AR2 and AR3.

Next, in step S 22, it is determined whether or not the object is in the approaching determination zone AR1, and in the case that it is determined that the object is in the approaching determination zone AR1 (YES in step S 22), the flow proceeds directly to step S 24. In contrast, in the case that it is determined the object is not in the approaching determination zone AR1 (NO in step S 22), invasive collision determination processing is carried out (step S 23).

Concretely, the invasive collision determination processing in step S 23 distinguishes whether or not the difference between xc(0), which is the most recent x coordinate on the image (the character c, as will be explained below, is attached in order to signify that it is a coordinate on which compensation has been carried out that makes the center position of the image align with the real spatial origin point O) and xc(N−1), which is the x coordinate before the time ΔT, satisfies the following Eq. 10, and in the case that it is satisfied, it is determined that the possibility of a collision is high.

$$\frac{-\alpha \cdot f}{2}\left(\frac{1}{Zv(0)} - \frac{1}{Zv(N-1)}\right) \le$$

$$xc(0) - xc(N-1) \le \frac{\alpha \cdot f}{2}\left(\frac{1}{Zv(0)} - \frac{1}{Zv(N-1)}\right)$$

Eq. 10

Moreover, as shown in FIG. 14, in the case that there is an animal progressing in a direction that is at an angle of approximately 90° with respect to the direction of the progress of the vehicle 10, when Xv(N−1)/Zv(N−1)=Xv(0)/Zr(0), or in other words, when the ratio of the velocity Vp and the relative velocity Vs of the animal is Vp/Vs=Xr(N−1)/Zr(N−1), the bearing θd viewing the animal 20 from the vehicle 10 becomes constant, and the possibility of a collision becomes high. Eq. 10 determines this possibility taking into account the width α of the vehicle 10.

In step S 23, in the case that it has been determined that the possibility of a collision is high (YES in step S 23), the flow proceeds to step S 24. In contrast, in the case that it has been determined that the possibility of a collision is low (NO in step S 23), the warning determination processing completes.

In step S 24, it is determined whether or not to carry out a warning output determination process, that is, a warning output (step S 24).

The warning output determination process determines whether or not the driver of the vehicle 10 is carrying out a braking action from the output BR of the brake sensor 5.

In the case that the driver of the vehicle 10 is carrying out a braking action, the acceleration Gs (positive in the deceleration direction) generated thereby is calculated, and when this acceleration Gs is larger than a predetermined threshold value GTH, it is determined that a collision can be avoided by the braking action, and the warning determination processing completes. Thereby, when an appropriate braking action is carried out, no warning is issued, and the driver will not be excessively annoyed.

In addition, when the acceleration Gs is equal to or less than a predetermined threshold GTH, and additionally, if the driver of the vehicle 10 is not carrying out a braking action, the flow immediately proceeds to the processing in step S 25 and following, and the shape determination of the object is carried out.

Moreover, the predetermined threshold value GTH is determined by the following Eq. 11. This is the value corresponding to the condition in which the vehicle 10 stops at a running distance equal to or less than the distance Zv(0) in the case that the acceleration Gs during the braking action is maintained as-is.

$$GTH = \frac{Vs^2}{2 \times Zv(0)}$$

Eq. 11

In the shape identification of the object in step S 25 and following, there are the following steps: identifying whether or not a part indicating a straight line segment is included in the image of the object (step S 25); whether or not an angle in the image of the object is a right angle (step S 26); whether or not the image of the object conforms to the shape of a pre-registered artificial structure (step S 27); and whether or not a plurality of identical shapes are included in the image of the object (step S 28).

First, it is identified whether or not a part indicating a straight line segment is included in the image of the object (step S 25).

In step S 25, in the case that a part indicating a straight line segment is not included in the image of the object (NO in step S 25), it is identified whether or not an angle in the image of the object is a right angle (step S 26).

In step S 26, in the case that an angle in the image of the object is not a right angle (NO in step S 26), it is identified whether or not the image of the object conforms to the shape of a pre-registered artificial structure (step S 27).

In step S 27, in the case that the image of the object does not conform to the shape of a pre-registered artificial structure (NO in step S 27), whether or not pluralities of identical shapes are included in the image of the object is identified (step S 28).

In addition, in step S 28, in the case that a plurality of identical shapes are not included in the image of the object (NO in step S 28), the possibility that the object is a pedestrian or an animal is high, and thus a warning is issued by voice through the speaker 3, and at the same time, by the image display apparatus 7, for example, the image obtained by the infrared camera 2R is displayed, and the approaching object is given an highlighted display (for example, highlighted by being surrounded by a frame) (step S 29).

In contrast, in step S 25, in the case that a part indicating a straight line segment in the image of the object is included (YES in step S 25), or in step S 26, in the case that an angle in the image of the object is a right angle (YES in step S 26), or in step S 27, in the case that the image of the object conforms to the shape of a pre-registered artificial structure (YES in step S 27), or further in step S 28, the case that a plurality of identical shapes are included in the image of the object (YES in step S 28), the object is treated as an artificial structure, and the object extracted in step S 7 of FIG. 3 is eliminated (step S 30), no warning is issued, and the warning determination processing is completed.

Next, the method for the identification of the shape of the object in FIG. 12 described above, and in particular, the search processing for straight line segments and right angle segments in step S 25, step S 26, step S 28, and step S 30 will be explained with reference to the figures.

FIG. 15, FIG. 16, FIG. 17, and FIG. 23 are flowcharts showing in further detail the processing in step S 25, step S 26, step S 28, and a part of the processing of step S 30.

Figure 15:
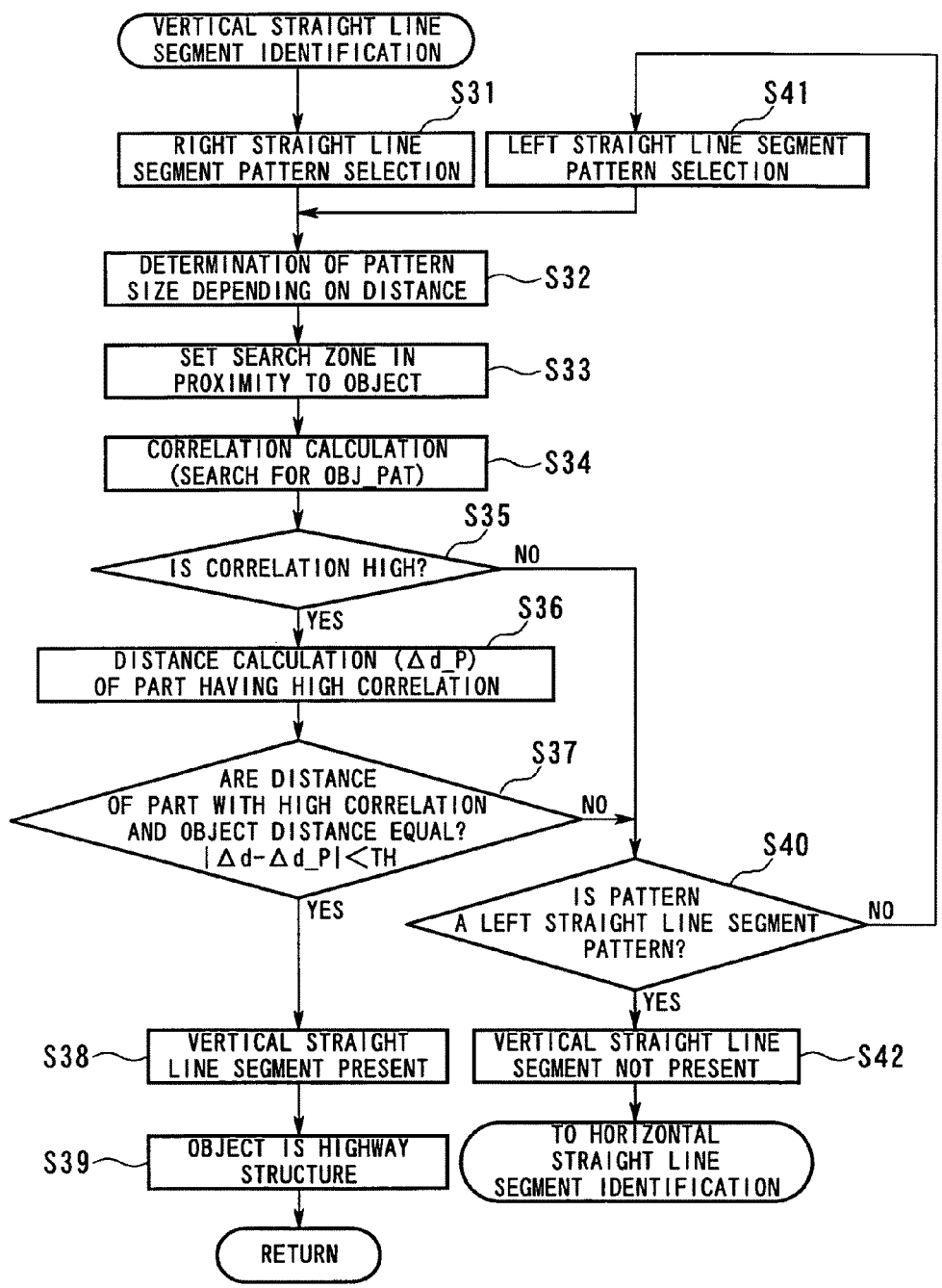
FIG. 15 is a flowchart showing the details of the detection processing of a vertical linear part in the image processing unit of the vehicle zone monitoring apparatus of the embodiment.

In the search for a straight line segment, the image processing unit 1 starts from the detection of vertical line segments (vertical straight line segment identification). FIG. 15 is a flowchart showing the vertical straight line segment identification.

Therefore, first in order to search for vertical straight line segments, the image of the object and the right straight line segment image pattern, which is a reference image for carrying out correlation calculation, are selected (step S 31), and depending on the distance between the vehicle 10 and the object found in step S 13 of the flowchart shown in FIG. 3, the pattern size of the reference image is determined so as to be in proportion to the size of the image of the real space projected onto the display image (step S 32).

Here, the determination of the pattern size of the reference image is carried out as follows. Specifically, in the case that the distance between the vehicle 10 and the object is calculated as z=L[m] by using the above Eq. 2, the object having a height A[m] and width B[m] at a position at distance L[m] in real space is projected at a size equal to a×b[pixel] on the display screen.

$$a = f \times A/L \qquad \text{Eq. 12}$$

$$b = f \times B/L \qquad \text{Eq. 13}$$

Therefore, as shown in FIG. 18A, from the right straight line segment image pattern prepared in advance, for example, the a×b [pixel] straight line segment pattern is extracted, and the right straight line segment extraction pattern "Pat_Line_R" serves as the reference pattern. Similarly, the a×b [pixel] left straight line segment extraction pattern "Pat_Line_L" extracted from the left straight line segment image pattern prepared in advance is shown in FIG. 18B.

When the reference size for the correlation calculation has been found, next the search zone in proximity to the object is set (step S 33).

Figure 19:
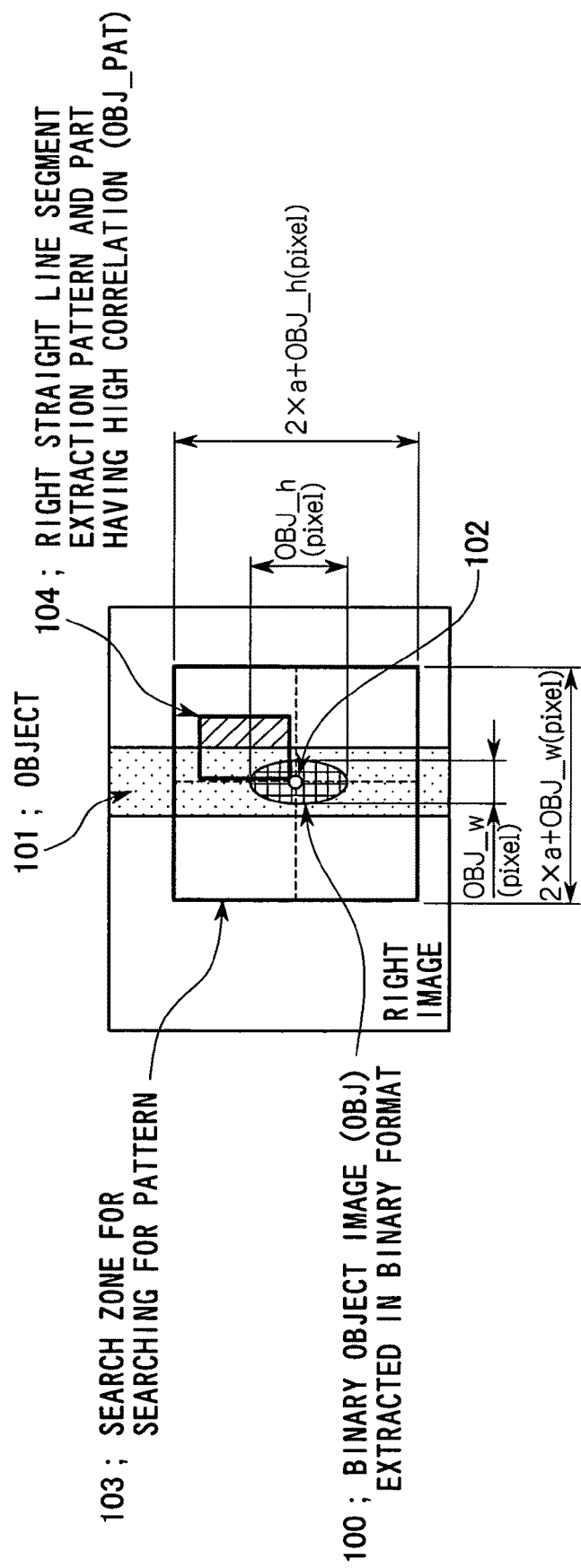
FIG. 19 is a drawing showing the search of the reference pattern for the vertical linear part search.

Here, the setting of the search zone is carried out as follows. Specifically, as shown in FIG. 19, the outline (the binary object image 100) that has been subject to binary extraction does not necessarily correctly represent the outline of the object 101. Therefore, with respect to the center 102 of the circumscribed quadrangle of the binary object image (OBJ) 100, the width and height of the search area are set to a height and width defined by respective upper, lower, left, and right a [pixel] ranges, and the search range 103 for the correlation calculation comprises these four a×a [pixel] ranges.

Next, from within the search zone 103 in proximity to the object, a section (OBJ_Pat) 104 having a high correlation with the right straight line segment extraction pattern "Pat_Line_R" is found by the correlation calculation (step S 34).

In addition, it is identified whether or not a part having a high correlation with the right straight line segment extraction pattern "Pat_Line_R" is present (step S 35).

In step S 35, in the case that a part having a high correlation with the right straight line segment extraction pattern "Pat_Line_R" is present (YES in step S 35), in order to determine whether or not the part having a high correlation and the object 101 are identical physical bodies, the distance of OBJ_Pat 104 is calculated in the same manner as the calculation of the distance of the object by the above Eq. 2 (step S 36).

Moreover, in the case that the actual distance between the vehicle 10 and the object 101 is equal to the distance between the vehicle 10 and the OBJ_Pat 104 having a high correlation, the object 101 and OBJ_PAT 104 can be identified to be identical physical bodies, and thus by comparing the calculated parallax Δd and Δd_P instead comparing distances, it can be identified whether or not the object 101 and OBJ_PAT 104 are identical physical bodies (step S 37). Specifically, using the following Eq. 14, it is determined whether or not the parallax error is smaller than an allowable value TH.

$$|\Delta d - \Delta d\_P| < TH \qquad \text{Eq. 14}$$

In step S 37, in the case that it is identified that the object 101 and the OBJ_Pat 104 are identical physical bodies (YES in step S 37), it is determined that there is a vertical straight line segment in the object 101 (step S 38), having a vertical straight line segment is treated as being an artificial highway structure (step S 39), and the vertical straight line determination completes.

In contrast, in step S 35, in the case that a part having a high correlation with the right straight line segment extraction pattern "Pat_Line_R" is not present (NO in step S 35), or in step S 37, in the case that the object 101 and the OBJ_Pat 104 are not identified as identical physical bodies (NO in step S 37), the flow proceeds to step S 40, and it is identified whether or not the reference pattern used in the correlation calculation is a left straight line segment image pattern (step S 40).

In step S 40, in the case that the reference pattern used in the correlation calculation was not a left straight line segment image pattern (NO in step S 40), the left straight line segment image pattern prepared in advance is selected (step S 41), and the flow returns to step S 32.

In addition, in step S 32 and step S 33 described above, the same action is carried out on the left straight line segment image pattern as the action carried out on the right straight line segment image pattern, and the a x b [pixel] left straight line segment extraction pattern "Pat_Line_L" extracted from the left straight line segment image pattern shown in FIG. 18B serves as the reference pattern. Furthermore, in step S 34, from inside the search range 103 in proximity to the object, the part (OBJ_Pat) having a high correlation with the left straight line segment extraction pattern "Pat_Line_L" is searched for using correlation calculation.

As a result of the correlation calculation using the left straight line segment extraction pattern, the actions from step S 35 to step S 39 described above are carried out, and when a vertical straight line segment is identified to be present in the object 101, the object 101 is treated as an artificial road structure, and the vertical straight line segment determination completes.

In addition, as a result of the correlation calculation using the left straight line segment extraction pattern, when the flow proceeds to the determination of step S 40 again, the search of the vertical straight line segment by both the right straight line segment extraction pattern and the left straight line segment extraction pattern has already completed (YES in step S 40), no vertical straight line segment is identified as being present (step S 42), and the flow proceeds to the horizontal straight line segment identification.

Moreover, in the vertical straight line segment identification described above, the reason that a correlation calculation is carried out using both the right straight line segment extraction pattern and the left straight line segment extraction pattern, and the distance between the vehicle 10 and the respective parts having high correlations is compared to the distance between object and the vehicle 10 is because in the case that a plurality of objects overlap and are recognized as one object, there is the possibility that the right or left straight line segments of the objects detected in the vertical straight line segment identification are not parts of the object subject to collision determination. Therefore, the distance between the object and the vehicle 10 is compared to the distance between the detected object and the right or left straight line segment of the vehicle 10, and it is identified whether both are identical physical bodies.

Figure 16:
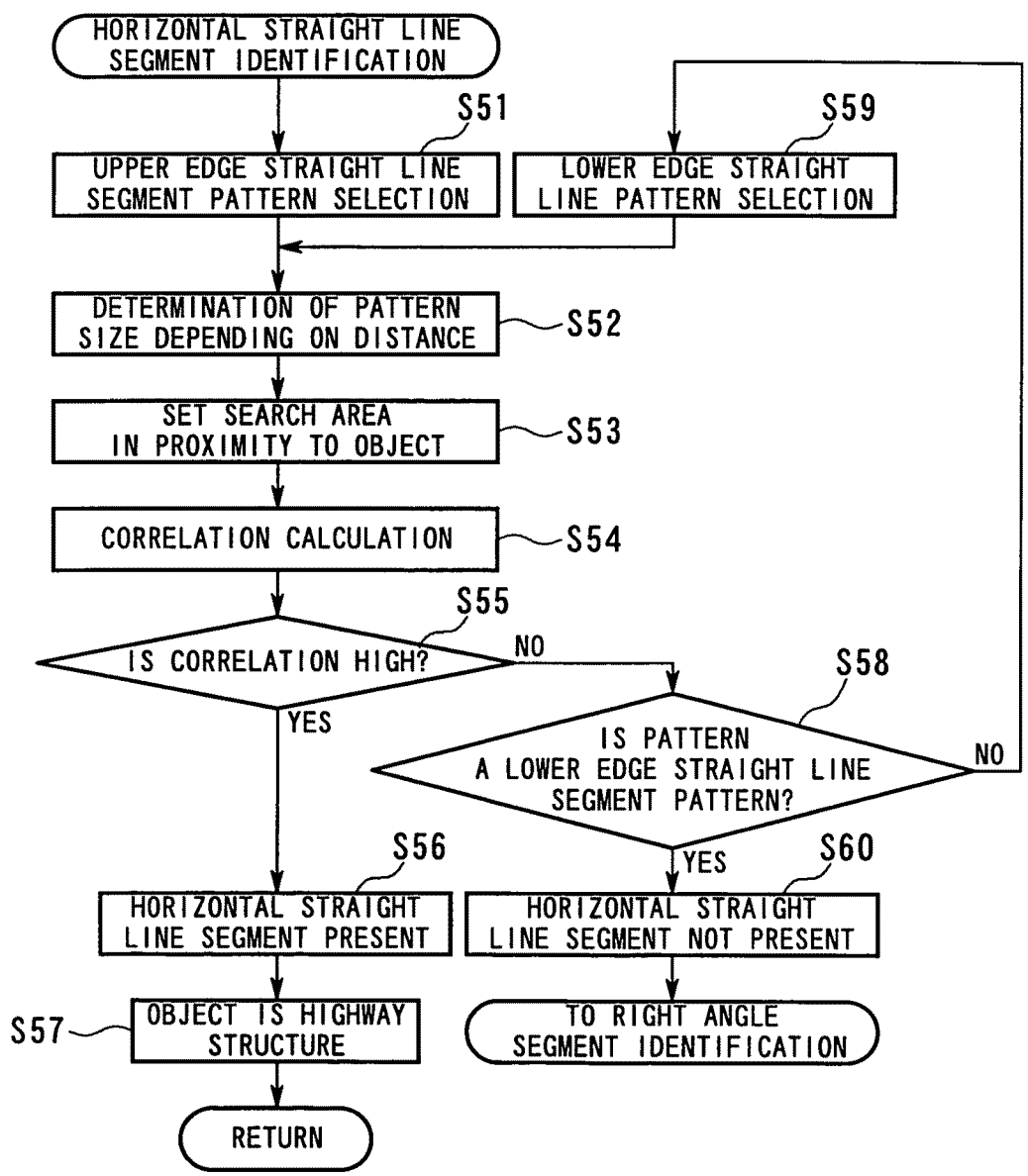
FIG. 16 is a flowchart showing the details of the process of detecting the horizontal linear part in the image processing unit of the vehicle zone monitoring apparatus of this embodiment.

Next, the horizontal straight line segment determination will be explained with reference to the flowchart shown in FIG. 16.

In the horizontal straight line segment determination, first, in order to search for a horizontal straight line segment, an upper edge straight line segment image pattern, which is the reference image for carrying out correlation calculation on the image of the object, is selected (step S 51), and depending on the distance between the vehicle 10 and the object found in step S 13 in the flowchart shown in FIG. 3, the pattern size of the reference image is determined so as to be in proportion to the size of the image in real space projected on the display screen (step S 52).

Here, the determination of the pattern size of the reference image is carried out in the same manner as the vertical straight line segment identification described above. That is, in the case that the distance between the vehicle 10 and the object is calculated as z=K[m] by the above Eq. 2, the object having the height B[m] and width A[m], which is at a position having a distance L[m] in real space, is projected at a b×a [pixel] size on the display screen.

$$b = f \times B/L \qquad \text{Eq. 15}$$

$$a = f \times A/L \qquad \text{Eq. 16}$$

Figure 20B:
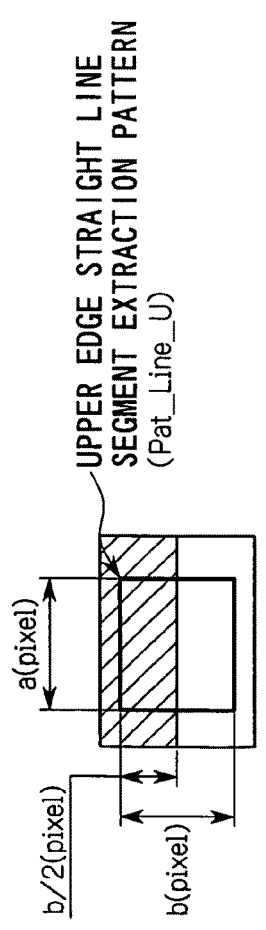
FIGS. 20A and 20B are drawings showing the details of the horizontal linear part extracted pattern in the search of the image.
Figure 20A:
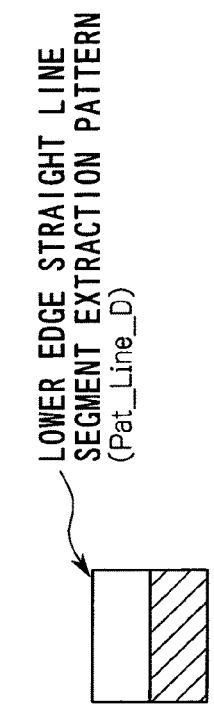

Therefore, as shown in FIG. 20A, for example, the b×a [pixel] straight line segment pattern is extracted from the upper edge straight line segment image pattern prepared in advance, and the upper edge straight line segment extraction pattern "Pat_Line_U" serves as the reference pattern. Similarly, the b×a [pixel] lower edge straight line segment extraction pattern "Pat_Line_D" extracted from the lower edge straight line segment image pattern prepared in advance is shown in FIG. 20B.

When the reference pattern size for correlation calculation has been found, next the search zone in proximity to the object is set (step S 53).

Moreover, the setting of the search zone is also carried out similarly to the vertical straight line segment identification described above. That is, with respect to the center of the circumscribed quadrangle of the binary object image (OBJ), the width and height of the search area are set to a height and width defined by respective upper, lower, left, and right a [pixel] ranges, and the search range 103 for the correlation calculation comprises these four a×a [pixel] ranges.

Next, from within the search range in proximity to the object, using the correlation calculation a part (OBJ_Pat) having a high correlation with the upper edge straight line segment extraction pattern "Pat_Line_U" is searched for (step S 54).

In addition, it is identified whether or not a part having a high correlation with the upper edge straight line segment extraction pattern "Pat_Line_U" is present (step S 55).

In step S 55, in the case that a part having a height correlation with the upper edge straight line segment extraction pattern "Pat_Line_U" is present (YES in Step S 55), it is identified whether there is a horizontal straight line segment in the object (step S 56). Having a horizontal straight line segment means that the object is to be treated as an artificial highway structure (step S 57), and the horizontal straight line segment determination completes.

In contrast, in step S 55, in the case that a part having a high correlation with the upper edge straight line segment extracting pattern "Pat_Line_U" is not present (NO in step S 55), it is identified whether or not the reference pattern used in the correlation calculation is a lower edge straight line segment image pattern (step S 58).

In step S 58, in the case that the reference pattern used in the correlation calculation is not the lower edge straight line segment image pattern (NO in step S 58), a lower edge straight line segment image pattern prepared in advance is selected (step S 59), and the flow returns to step S 52.

In addition, in step S 52 and step S 53 described above, the same actions carried out on the upper edge straight line segment image pattern are carried out on the lower edge straight line segment image pattern, and the b×a [pixel] lower edge straight line segment extraction pattern "Pat_Line_D" extracted from the lower edge straight line segment image pattern shown in FIG. 20B serves as the reference pattern. Furthermore, in step S 54, the part (OBJ_Pat) having a high correlation with the lower edge straight line segment extraction pattern "Pat_Line_D" is found using the correlation calculation from within the search range in proximity to the object.

As a result of the correlation calculation using the lower edge straight line segment extraction pattern, the actions from step S 55 to step S 57 described above are carried out, and when it is identified that a horizontal straight line segment is present in the image, the object is treated as an artificial structure, and the horizontal straight line segment identification completes.

In addition, as a result of the correlation calculation using the lower edge straight line segment extraction pattern, when the flow proceeds to the identification of step S 58 again, because the search for horizontal straight line segments using both the upper edge straight line segment extraction pattern and the lower edge straight line segment extraction pattern have already completed (YES in step S 58), no horizontal straight line segments are identified as being present (step S 60), and the flow proceeds to the right angle segment identification.

Moreover, in the horizontal straight line segment identification described above, the reason for finding the distance between the respective parts having a high correlation and the vehicle 10 after carrying out the correlation calculation using both the upper edge straight line segment extraction pattern and the lower edge straight line segment extraction pattern is because, based on the principle of binary vision using the left and right cameras, the distance of the horizontal straight line segment cannot be calculated. Therefore, unlike the case of the vertical straight line segment identification, in the horizontal straight line identification, the identification based only on the correlation of the straight line pattern is carried out.

Figure 17:
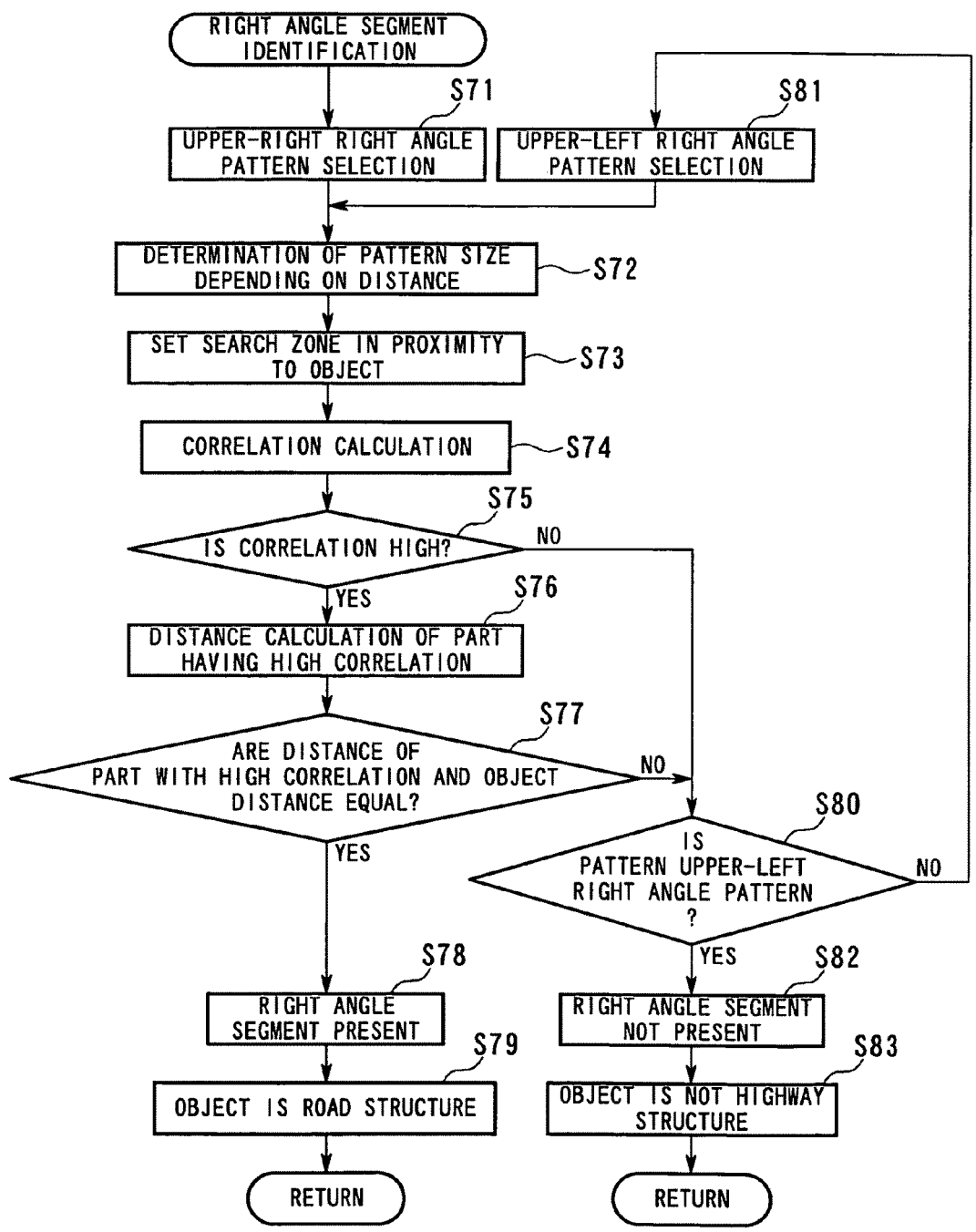
FIG. 17 is a flowchart showing the details of the process of detecting the quadrangle part in the image processing unit of the vehicle zone monitoring apparatus of this embodiment.

Next, the right angle segment determination will be explained with reference to the flowchart shown in FIG. 17.

In the right angle segment determination, first, in order to search for a right angle segment, the image of the object and an upper-right right angle segment image pattern, which is the reference image for carrying out the correlation calculation, are selected (step S 71). Depending on the distance between the vehicle 10 and the object found in step S 13 of the flowchart shown in FIG. 3, the pattern size of the reference image is determined so as to be in proportion to the size of the image in real space projected on the display screen (step S 72).

Here, the determination of the pattern size of the reference image is carried out in the same manner as that of the vertical straight line segment identification and the horizontal straight line segment identification. Specifically, in the case that the distance between the vehicle 10 and the object is calculated as z=L[m] by using the above Eq. 2, the object having a height A[m] and width A[m] at a position at distance L[m] in real space is projected at an a×a[pixel] size on the display screen.

$$a = f \times A/L \qquad \text{Eq. 17}$$

Therefore, as shown in FIG. 21A, from the upper-right right angle segment image pattern prepared in advance, for example, the a×a [pixel] right angle segment pattern is extracted, and the upper-right right angle segment extraction pattern "Pat_Corner_R" serves as the reference pattern. Similarly, the a×a [pixel] upper-left right angle segment extraction pattern "Pat_Corner_L" extracted from the upper-left right angle segment image pattern prepared in advance is shown in FIG. 21B.

When the reference size for the correlation calculation has been found, next the search zone in proximity to the object is set (step S 73).

Moreover, the setting of the search zone is also carried out similarly to the vertical straight line segment identification and the horizontal straight line segment identification described above. That is, at the center of an circumscribed quadrangle of a binary object image (OBJ), the width and height set respectively a [pixel] rang for the width and the top and bottom of the binary object image, and this serves as the search range for the correlation calculation.

Next, from within the search range in proximity to the object, using the correlation calculation, a part (OBJ_Pat) having a high correlation with the upper-right right angle segment extraction pattern "Pat_Corner_R" is searched for (step S 74).

In addition, it is determined whether or not a part having a high correlation with the upper-right right angle segment extraction pattern "Pat_Corner_R" is present (step S 75).

In step S 75, in the case that a part having a high correlation with the upper edge straight line segment extraction pattern "Pat_Corner_R" is present (YES in Step S 75), and the distance of the OBJ_Pat is calculated similarly to the distance calculation of the object using Eq. 2 above in order to identify whether or not the part with a high correlation and the object are identical physical bodies (step S 76).

Moreover, in the case that the actual distance between the vehicle 10 and the object is equal to the distance between the vehicle and the part OBJ_Pat having a high correlation the object and OBJ_Pat are identified as being identical physical bodies and thus by comparing the detected parallax $\Delta d$ and $\Delta d\_P$ instead of comparing the distances, it can be identified whether or not the object and OBJ_Pat are identical physical bodies (step S 77). Specifically, using the above Eq. 14, it is identified whether or not the parallax error is smaller than an allowable value TH.

In step S 77, in the case the object and OBJ_Pat are identified as being identical physical bodies (YES in step S 77), a right angle segment in the object is identified to be present (step S 78), having a right angle segment is treated as being an artificial highway structure (step S 79), and the right angle segment identification completes.

In contrast, in step S 75, in the case that a part having a high correlation with the upper-right right angle segment extraction pattern "Pat_Corner_R" is not present (NO in step S 75), or in step S 77, in the case that the object and OBJ_Pat are not identified as identical physical bodies (NO in step S 77), the flow proceeds to step S 80, and it is identified whether or not the reference pattern used in the correlation calculation is an upper-left right angle segment image pattern (step S 80).

In step S 80, in the case that the reference pattern used in the correlation calculation is not the upper-left right angle segment image pattern (NO in step S 80), the upper-left right angle segment image pattern prepared in advance is selected (step 81), and the flow proceeds to step S 72.

In addition, in step S 72 and step S 73 described above, the same action carried out for the upper-right right angle segment image pattern is carried out for the upper-left right angle segment image pattern, and the a×a [pixel] upper-left right angle segment extraction pattern "Pat_Corner_L" extracted from the upper-left right angle segment image pattern shown in FIG. 21B serves as the reference pattern. Furthermore, in step S 74, the part having a high correlation with the upper-left right angle segment extraction pattern "Pat_Corner_L" is searched for using the correlation calculation from within the search zone in proximity to the object.

As a result of the correlation calculation using the upper-left right angle segment extraction pattern, the actions from step S 75 to step S 79 are carried out, and when a right angle segment is identified as being present in the object, the object 101 is treated as an artificial highway structure, and the right angle segment identification completes.

In addition, as a result of the correlation calculation using the upper-left right angle segment extraction pattern, when the flow proceeds to the identification of step S 80 again, the search for right angle segments using both the upper-right right angle segment extraction pattern and the upper-left right angle segment extraction pattern has already completed (YES in step S 80), and thus no right angle segment is identified as being present (step S 82).

Figure 12:
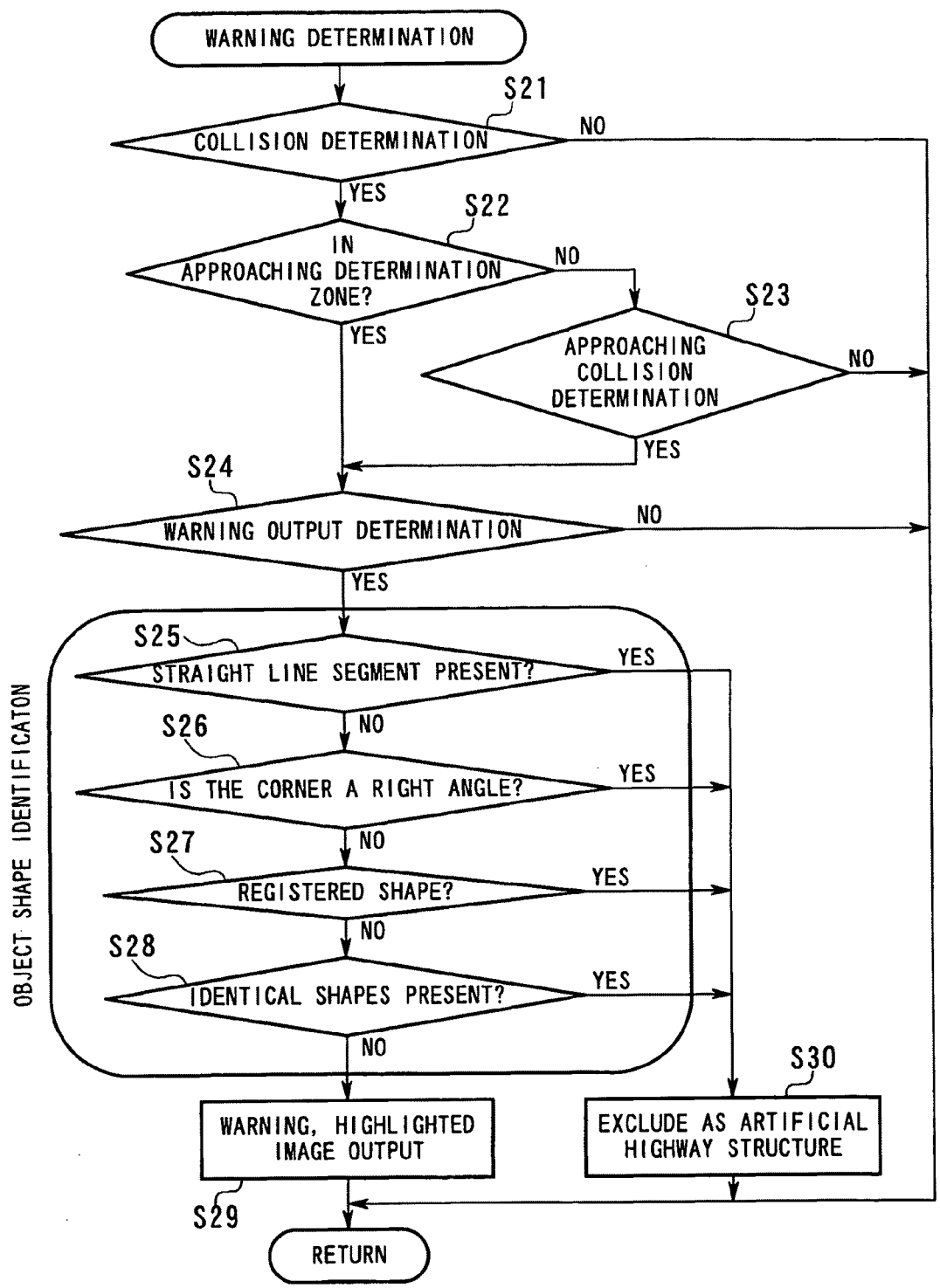
FIG. 12 is a flowchart showing the details of the warning determining processing in the image processing unit of the vehicle zone monitoring apparatus of this embodiment.

Therefore, it is determined that the object is not an artificial highway structure (step S 83), the right angle segment determination completes, and the processing in step S 27 to determine the shape of the object in FIG. 12 described above is executed.

Moreover, in the right angle segment identification described above, the reason that the correlation calculation is carried out using both the upper-right right angle segment extraction pattern and the upper-left right angle segment extraction pattern and that the distance between the parts having respective high correlations and the vehicle 10 is compared to the distance between the object a the vehicle 10 is the same as the case of the vertical straight line segment identification.

Next, the determination of identical shapes will be explained with reference to the figures.

Figure 22:
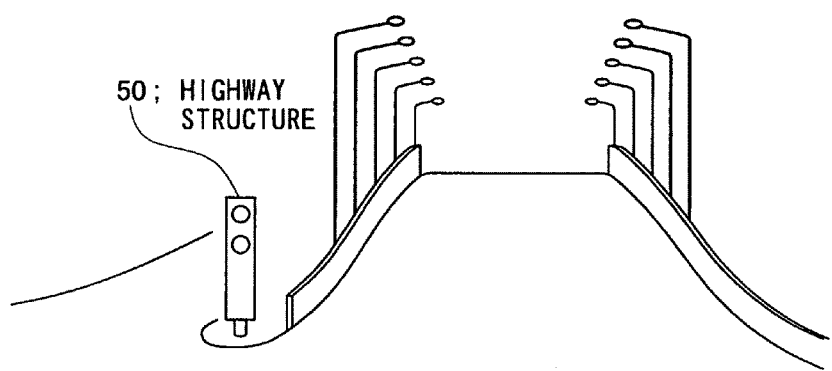
FIG. 22 is a drawing showing an example of a highway structure obtained by the infrared camera.

As shown in FIG. 22, the identification of identical shapes is a process in which a highway structure 50 (for example, an upper and lower round lens disposed in a traffic signal) structured from a plurality of physical bodies having an identical shape is searched for from among the infrared images obtained by the infrared cameras.

Figure 23:
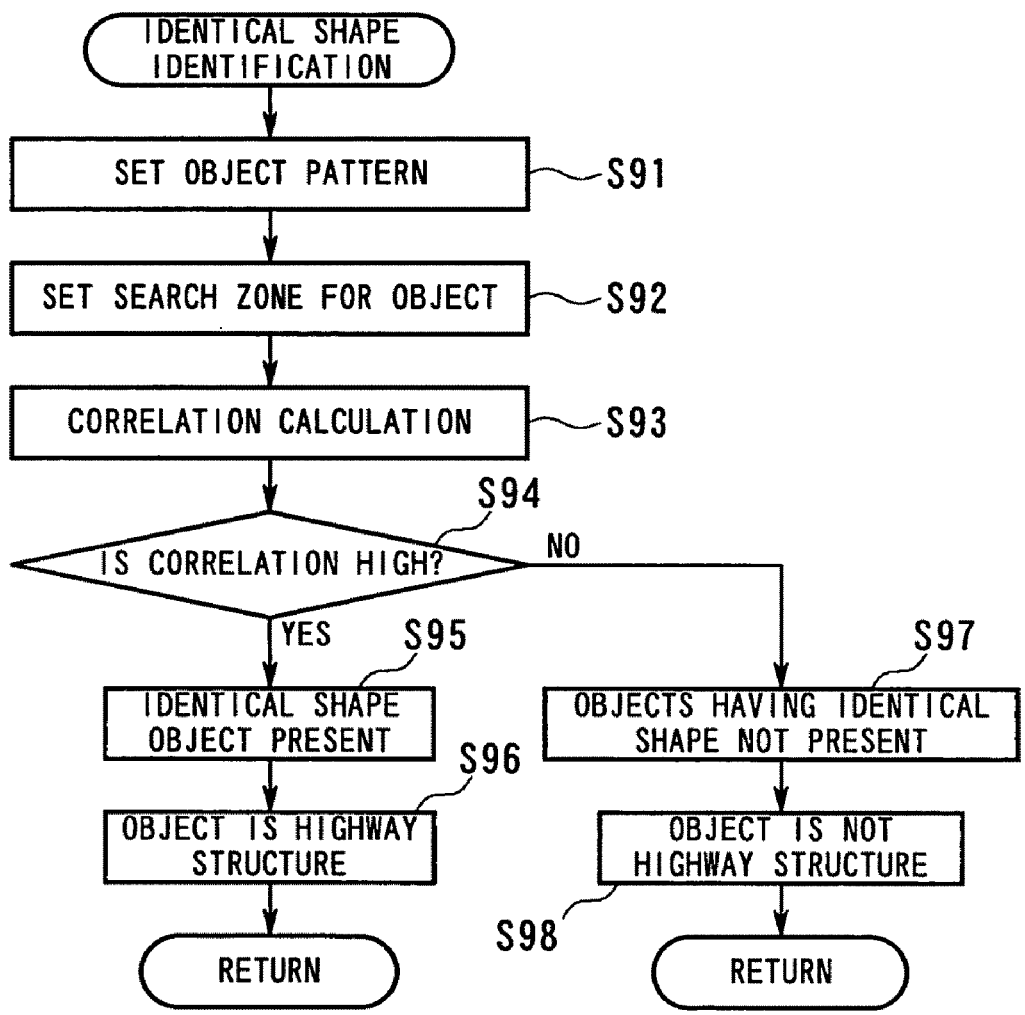
FIG. 23 is a flowchart showing the details of the process of detecting identical shapes in the image processing unit of the vehicle zone monitoring apparatus of this embodiment.

The flowchart shown in FIG. 23 will be used in the explanation. First, in order to search for identical shapes, the image of the object and an object pattern "Pat", which is a reference image for carrying out the correlation calculation, are set (step S 91).

Here, the object pattern "Pat" is the reference image that sets the zone one size larger than the binary object image (OBJ) 200, as shown in FIG. 24B, in the case, for example, that the part of the lens in the highway structure 50 that emits heat is extracted as the binary object image (OBJ) 200 as shown in FIG. 24A.

When the object pattern for the correlation calculation has been found, next, the search zone in proximity to the object is set (step S 92).

Here, the setting of the search zone is carried out as follows. Specifically, as shown in FIG. 24A, the range of the search zone is set such there is an upper and lower a [pixel] height above and below the binary object image 200 and there is a left and right b/2 [pixel] width on the right and left with respect to the center of the binary object image 200, and this serves as the respective upper search range 202 and the lower search range 203 using the correlation calculation.

Next, a part (OBJ_Pat) having a high correlation with the object pattern "Pat" is searched for using the correlation calculation from within the upper search range 202 and the lower search range 203 in proximity to the object (step S 93).

In addition, it is identified whether or not a part having a high correlation with the object pattern "Pat" is present (step S 94).

In step S 94, in the case that a part having a high correlation with the object pattern "Pat" is present (YES in step S 94), a shape identical to the object is identified as being present (step S 95), having an identical shape is treated as being an artificial highway structure (step S 96), and the identical shape identification completes. Moreover, in the example in FIG. 22, from the center of the infrared image, a highway structure (traffic signal) having a plurality (2) of identical objects (round lenses) is detected.

In contrast, in step S 94, in the case that a part having a high correlation with the object pattern "Pat" is not present (NO in step S 94), no shape identical to the object is identified as being present (step S 97), having no identical shape is treated as not being an artificial highway structure (step S 98), and the identical shape identification completes.

Moreover, in the identical shape identification described above, the setting of the search zone in which the object pattern is searched for was set in the vertical direction of the binary object image (OBJ) 200, but because the physical bodies having an identical shape may also be arranged left to right, after searching in a vertical direction, the search zone can be set left to right, and an object pattern searched for.

In addition, in the present embodiment, the image processing unit 1 comprises an object extraction device, an artificial structure identification device, and a reference image dimension altering device. More concretely, S1 to S7 in FIG. 3 correspond to the object extraction device, S 25 to S 28 in FIG. 12 correspond to the artificial structure identification device, and S 30 in FIG. 12 corresponds to the artificial structure elimination device. Furthermore, S 32 in FIG. 15, S 52 in FIG. 16, and S 72 in FIG. 17 correspond to the reference image dimension-altering devices.

In addition, in the embodiment described above, the case in which infrared cameras 2R and 2L were used as the photographing device, but a television camera that can detects only normal visible light, such as that disclosed in Japanese Unexamined Patent Application, First Publication, No. Hei 9-226490, can also be used. However, by using an infrared camera, the extraction processing of animals or other traveling vehicles or the like can be shortened, and thus it can be realized using a relatively low level of the computational capacity of the computation apparatus. In addition, in the embodiment described above, the example of monitoring in front of the vehicle was provided, but the back of the vehicle or any other direction can be monitored.

As explained above, the result of monitoring the environment in the vicinity of the vehicle is treated by being classified into moving physical bodies such as pedestrians and animals, and artificial highway structures, and thus, for example, in the case that the environment in the vicinity of the vehicle is displayed to the driver of the vehicle, the method of displaying these objects can be different, and the driver appropriately notified of physical bodies towards which more careful attention should be paid.

In addition, for example, in the case that the information about these physical bodies is used in vehicle control, depending on the classification and importance of the physical bodies, they can be used as determination material for altering the order of the vehicle control.

As described above, according to a first aspect of the present invention, the image of a plurality of objects that emit heat present in an infrared image photographed by a photographing device is compared with a reference image, and it becomes possible to distinguish whether this physical body is an artificial structure having a determined shape or a moving physical body such as a pedestrian or animal.

Therefore, by classifying objects extracted from the infrared image into artificial structures and natural structures, there is the effect that physical bodies that are important and to which more careful attention should be paid in relation to the travel of the vehicle can be reliably recognized.

In addition, compared to the case in which pedestrians and animals having indefinite shapes are extracted from an object by shape identification of the thing itself, because physical bodies having determined shapes are detected, the effect can be obtained that recognition of the object is carried out with less computing and higher detection precision.

According to a second aspect of the present invention, in order to extract objects excluding artificial structures to which attention should be paid, artificial structures are eliminated from the objects extracted from the infrared image, and the remaining objects can be recognized as moving physical bodies.

Therefore, by excluding artificial structures and treating only objects that are not artificial structures extracted from the infrared image, the effect is attained that the recognition of important physical bodies can be improved.

In addition, according to a third aspect of the present invention, by identifying whether or not there is a straight line segment that simply characterizes artificial structures in the image, objects having straight line segments can be excluded as artificial structures, and objects that are not artificial structures can be recognized.

Therefore, highway structures can be removed from the infrared image comparatively easily, and the effect can be attained that the detection precision of pedestrians and animals that nave an indefinite shape can be improved.

According to a fourth aspect of the present invention, by compensating for differences in the sizes between the object image and reference image produced by the distance between the object and vehicle and comparing both with an appropriate size, the effect is attained that the precision in detecting whether or not the object is an artificial structure is improved.

Therefore, there are the effects that detection errors due to the distance between the vehicle and the object can be avoided and environmental monitoring in the vicinity of the vehicle can be carried out over a wide area.

In this manner, due to recognition by distinguishing physical bodies that move such as pedestrians and animals from artificial highway structures, the information about these physical bodies can be used in the vehicle control, and in the case that this information is displayed as information or warnings to the driver of the vehicle, it can be used as material for determining for altering the display method of the information and warnings depending on the content and importance of the object or the control method of the vehicle.

Although there has been described above the present embodiment of the invention, it will be understood by persons skilled in the art that variations and modifications may be made thereto without departing from the gist, spirit or essence of the invention as set forth in the appended claims.

What is claimed is:

1. A vehicle zone monitoring apparatus that detects a physical body present in the vicinity of the vehicle from infrared images photographed by a photographing device, comprising:

an object extraction device that extracts an object that emits infrared radiation from said infrared images;

an artificial structure identifying device that compares an image of a search zone in proximity to said object extracted by said object extraction device, to a reference image of a pre-registered artificial structure which serves as an element that defines an artificial structure, and that identifies said object as an artificial structure if:

within said search zone in proximity to said object, a section having a high correlation with said reference image exists; and a distance between said vehicle and said object is equal to a distance between said vehicle and said section having the high correlation with said reference image; and an artificial structure eliminating device that eliminates objects identified to be artificial structure by said artificial structure identifying device from the object extracted by said object extracting device.

2. A vehicle zone monitoring apparatus according to claim 1, wherein:
said reference image includes an image that represents a straight line segment; and
said artificial structure identifying device identifies an object that includes a vertical straight line segment or a right angle segment, as an artificial structure.

3. A vehicle zone monitoring apparatus according to claim 2, wherein:
said artificial structure identifying device comprises a reference image dimension altering device that alters a size of said reference image proportionally to the distance between said vehicle and said object.

4. A vehicle zone monitoring apparatus according claim 1, wherein:
said artificial structure identifying device comprises a reference image dimension altering device that alters a size of said reference image proportionally to the distance between said vehicle and said object.

5. A vehicle zone monitoring apparatus according to claim 1, wherein:
said reference image includes an image that represents a straight line segment; and
said artificial structure identifying device identifies an object that includes a straight line segment as an artificial structure.

6. A vehicle zone monitoring apparatus according to claim 1, wherein:
said artificial structure identifying device comprises a reference image dimension altering device that alters a size of said reference image proportionally to the distance between said vehicle and said object.

* * * * *